(12) United States Patent
Lazarescu et al.

(10) Patent No.: US 10,148,535 B2
(45) Date of Patent: *Dec. 4, 2018

(54) MOBILE DEVICE SESSION ANALYZER

(71) Applicant: Pearson Education, Inc., New York, NY (US)

(72) Inventors: Alec Lazarescu, Fanwood, NJ (US); Matthew Shapiro, Aurora, CO (US)

(73) Assignee: PEARSON EDUCATION, INC., New York, NY (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/439,372

(22) Filed: Feb. 22, 2017

(65) Prior Publication Data

US 2017/0164217 A1   Jun. 8, 2017

Related U.S. Application Data

(63) Continuation of application No. 14/850,595, filed on Sep. 10, 2015, now Pat. No. 9,614,734.

(51) Int. Cl.
*H04L 12/26* (2006.01)
*H04L 29/08* (2006.01)
(Continued)

(52) U.S. Cl.
CPC .......... *H04L 43/04* (2013.01); *H04L 41/5009* (2013.01); *H04L 67/142* (2013.01);
(Continued)

(58) Field of Classification Search
CPC ....... H04L 67/22; H04L 41/14; H04L 67/142; H04L 67/143; H04L 67/16; H04L 67/32; H04L 67/42; H04L 43/045; H04L 43/065; H04L 43/067; H04L 43/0805; H04L 43/0811; H04W 88/02; G06F 11/34; G06F 11/3438; G06F 11/3447; G06F 11/3552; G06F 11/3457; G06F 11/3476; G06F 11/3485; G06F 11/349; G06F 11/3495; G06F 19/3406; G06F 19/3418; G06F 19/345; G09B 7/00; G09B 5/00;
(Continued)

(56) References Cited

U.S. PATENT DOCUMENTS 8,672,686 B2 *   3/2014   Ferreira .................. G09B 7/08
                                                            434/322
2008/0052387 A1   2/2008   Heinz
(Continued)

*Primary Examiner* — Greg C Bengzon
(74) *Attorney, Agent, or Firm* — Quarles and Brady LLP

(57) ABSTRACT

Techniques described herein relate to determining performance conditions for mobile device execution sessions based on analyses of session context data and performance data associated with content resource execution sessions. Mobile devices may receive and execute content resources via input/output subsystems, during which feedback data by the mobile devices. Mobile devices also may be configured to detect and/or determine context data associated with specific content resource execution sessions, using device sensors and other techniques. Session analyzers may receive and analyze content resource execution session data received from one or more mobile devices, and determine user performance conditions for content resource execution sessions.

19 Claims, 15 Drawing Sheets

(51) Int. Cl.
*H04L 12/24* (2006.01)
*H04W 4/029* (2018.01)
*H04W 4/02* (2018.01)
*H04W 24/02* (2009.01)
*H04W 24/08* (2009.01)

(52) U.S. Cl.
CPC .............. *H04L 67/22* (2013.01); *H04L 67/26* (2013.01); *H04L 67/303* (2013.01); *H04L 67/306* (2013.01); *H04L 67/32* (2013.01); *H04W 4/027* (2013.01); *H04W 4/029* (2018.02); *H04W 24/02* (2013.01); *H04W 24/08* (2013.01)

(58) Field of Classification Search
CPC ... G09B 7/02; G09B 7/06; G09B 7/07; G09B 7/073; G09B 7/077; G09B 9/00; G09B 9/052; G09B 19/00; G09B 9/003; A61B 5/0006; A61B 5/16; A61B 5/162; A61B 5/165; A61B 5/167; A61B 5/168; A61B 5/0022; A61B 5/0024; A61B 5/0476; A61B 5/486; A61B 5/01; A61B 5/024; A61B 5/0402; A61B 5/1112; A61B 5/1118; A61B 5/1123; A61B 5/14542; A61B 5/6898; A61B 5/7267; G06Q 10/063; G06Q 10/06311; G06Q 30/0204; G06Q 30/0242; G06Q 30/0251; G06N 3/0454
See application file for complete search history.

(56) References Cited

U.S. PATENT DOCUMENTS

| | | |
|---|---|---|
| 2011/0177480 A1 | 7/2011 | Menon |
| 2011/0281253 A1* | 11/2011 | Wei .......................... G09B 7/00 434/350 |
| 2012/0023226 A1 | 1/2012 | Petersen |
| 2012/0041904 A1 | 2/2012 | Wit |
| 2012/0077158 A1 | 3/2012 | Jastrzembski |
| 2013/0004929 A1 | 1/2013 | Otwell |
| 2013/0089839 A1* | 4/2013 | Drane .................... G09B 19/00 434/219 |
| 2013/0089840 A1* | 4/2013 | Drane .................... G09B 19/00 434/219 |
| 2013/0089851 A1* | 4/2013 | Drane ..................... G09B 5/06 434/362 |
| 2013/0224699 A1 | 8/2013 | Jastrzembski |
| 2014/0057244 A1 | 2/2014 | Roots |
| 2014/0114889 A1 | 4/2014 | Dagum |
| 2014/0227674 A1 | 8/2014 | Wit |
| 2014/0257055 A1 | 9/2014 | Pacione |
| 2014/0316230 A1 | 10/2014 | Denison |
| 2014/0335499 A1 | 11/2014 | Miele |
| 2014/0370479 A1 | 12/2014 | Gazzaley |
| 2015/0007307 A1 | 1/2015 | Grimes |
| 2015/0112796 A1 | 4/2015 | Greenzeiger |
| 2015/0112899 A1 | 4/2015 | Dagum |
| 2015/0121246 A1 | 4/2015 | Poore |
| 2015/0164418 A1 | 6/2015 | Johnson |
| 2015/0206443 A1* | 7/2015 | Aylesworth .............. G09B 5/00 434/322 |
| 2015/0269857 A1 | 9/2015 | Feng |

* cited by examiner

Example Device Table

710

| Device ID | Screen Size | Screen Res. | Touch Screen | Keyboard | Voice Control | ... |
|---|---|---|---|---|---|---|
| xxxxxx | nnnnn | NNxNN | Y | N | Y | ... |
| xxxxxx | nnnnn | NNxNN | N | N | N | ... |
| xxxxxx | nnnnn | NNxNN | Y | Y | Y | ... |
| xxxxxx | nnnnn | NNxNN | N | Y | N | ... |
| xxxxxx | nnnnn | NNxNN | N | Y | Y | ... |
| xxxxxx | nnnnn | NNxNN | N | N | Y | ... |

FIG. 7A

Example Mobile Device Session Table

720

| Session ID | User ID | Device ID | Resource IDs | Start Time | Stop Time | Location | ... | Session Performance |
|---|---|---|---|---|---|---|---|---|
| yyyyyy | abcdef | xxxxxx | nnnn | 02:34 | 02:58 | xx N,xx W | ... | 93 |
| yyyyyy | abcdef | xxxxxx | nnnn | 13:45 | 17:15 | xx N,xx W | ... | 14 |
| yyyyyy | abcdef | xxxxxx | nnnn | 17:55 | 18:40 | xx N,xx W | ... | 35 |
| yyyyyy | abcdef | xxxxxx | nnnn | 04:31 | 07:02 | xx N,xx W | ... | 88 |
| yyyyyy | abcdef | xxxxxx | nnnn | 12:21 | 12:33 | xx N,xx W | ... | 52 |
| yyyyyy | abcdef | xxxxxx | nnnn | 07:50 | 11:55 | xx N,xx W | ... | 87 |

FIG. 7B

Example Performance Condition Table

1010

| Session Context Variable | Value | Performance +/- |
|---|---|---|
| Session Time | M-F (am) | + 4.5 |
| Session Time | Sun (12-4pm) | - 2.1 |
| ... | ... | ... |
| Session Location | Home | + 8.6 |
| Session Location | Work | + 6.5 |
| Session Location | Vehicle | - 1.5 |
| ... | ... | ... |
| Device Type | Tablet | - 0.7 |
| Device Type | Smartphone | - 4.3 |
| ... | ... | ... |
| Device Capability | Touchscreen | + 7.3 |
| Device Capability | Color Graphics | + 0.3 |
| ... | ... | ... |
| Network Type | IEEE 802.11n | + 1.4 |
| Network Speed | 40 MHz | + 3.6 |
| Concurrent Application Use | Music App. | - 1.2 |
| Ambient Noise Level | 60-65 dB | - 6.7 |
| Device Movement | None | + 3.5 |
| ... | ... | ... |
| Last Sleep Data | 4-6 hours | - 2.0 |
| Daily Sugar Intake | > 140 grams | - 5.2 |
| Last Exercise | Same day | + 5.5 |
| ... | ... | ... |

| User | CDN/Resource Type | Perf. Cond. Table |
|---|---|---|
| User A | Gaming/Game ABC | 1010 |
| User A | eLearning/Video Modules | NNNN |
| User A | eLearning/Interactive Modules | NNNN |
| ... | ... | ... |
| User B | Media/Movies and Programming | NNNN |
| ... | ... | ... |

FIG. 10B

Example Session Group Table

| User | CDN/Resource Type | # of Sessions | Ave. Sess. Length | Ave. Time Interval | Session Group Performance |
|---|---|---|---|---|---|
| User A | eLearning – Module 4 | 7 | 94 mins | 4.5 days | 87 |
| User A | eLearning – Module 5 | 10 | 55 mins | 3 days | 82 |
| User A | eLearning – Module 6 | 4 | 173 mins | 0.8 days | 71 |
| ... | ... | ... | ... | ... | ... |
| User B | eLearning – Module 5 | 14 | 21 mins | 1.0 days | 93 |
| ... | ... | ... | ... | ... | ... |

MOBILE DEVICE SESSION ANALYZER

CROSS-REFERENCES TO RELATED APPLICATIONS

This application is a continuation of U.S. Non-Provisional application Ser. No. 14/850,595, entitled "MOBILE DEVICE SESSION ANALYZER", filed on Sep. 10, 2015, which is incorporated herein by reference in its entirety for all purposes.

BACKGROUND

Effective performance and interactions during execution sessions on mobile devices is often challenging. Different mobile devices may have unique sets of device capabilities and characteristics. Additionally, multiple mobile devices may be related and used to perform similar tasks and execute related sets of content resources. Certain mobile device may be personal and individual devices, while others may be shared devices. Moreover, the computing conditions and physical environments in which mobile devices are used to perform tasks and execute resources may be constantly changing. For example, mobile devices may be used at different times and places, and in different network conditions, physical environments, and the like, which may result in varying and unpredictable performance during different content resource execution sessions.

BRIEF SUMMARY

Various techniques (e.g., systems, methods, computer-program products tangibly embodied in a non-transitory machine-readable storage medium, etc.) are described herein for determining performance conditions for mobile device execution sessions based on analyses of session context data and performance data associated with content resource execution sessions. Mobile devices may receive and execute content resources via input/output subsystems, during which feedback data by the mobile devices. Mobile devices also may be configured to detect and/or determine context data associated with specific content resource execution sessions, using device sensors and other techniques. Session analyzers may receive and analyze content resource execution session data received from one or more mobile devices, and determine user performance conditions for content resource execution sessions.

Additional techniques discussed herein relate to monitoring one or more mobile devices after set of performance conditions have been determined for the mobile devices and/or associated users. Current context data for each mobile device may be tracked and monitored, in order to provide notifications and resource suggestions based on performance conditions associated with users, mobile devices, and/or content resource types. Further techniques described herein relate to determining performance conditions and monitoring mobile device context data based on groups of related content resource execution sessions.

BRIEF DESCRIPTION OF THE DRAWINGS

FIGS. 7A and 7B are illustrative data tables containing example sets of mobile device data and session data, according to one or more embodiments of the disclosure.

FIGS. 10A and 10B are illustrative data tables containing example performance condition data, according to one or more embodiments of the disclosure.

In the appended figures, similar components and/or features may have the same reference label. Further, various compo of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
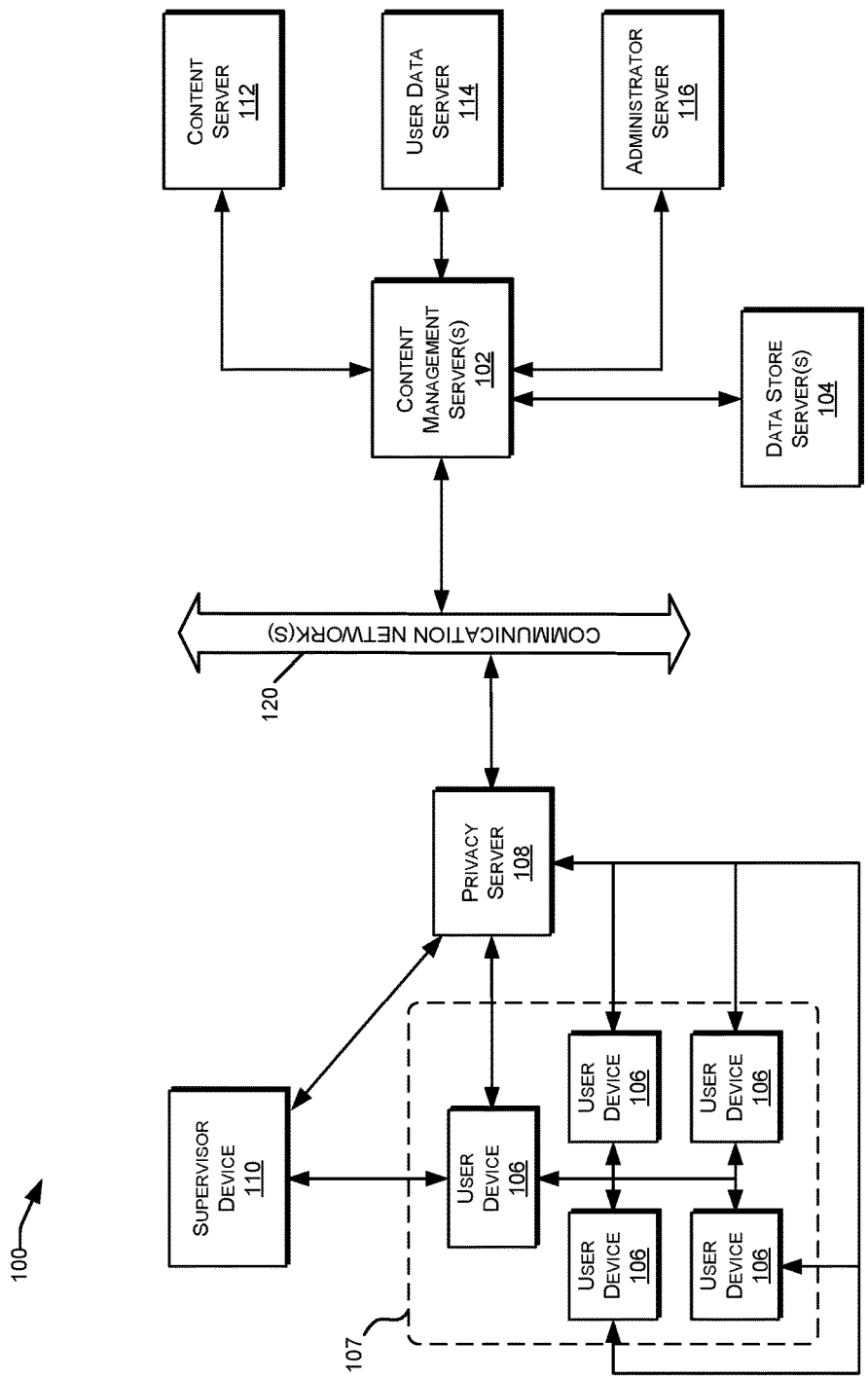
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming systems, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

Figure 2:
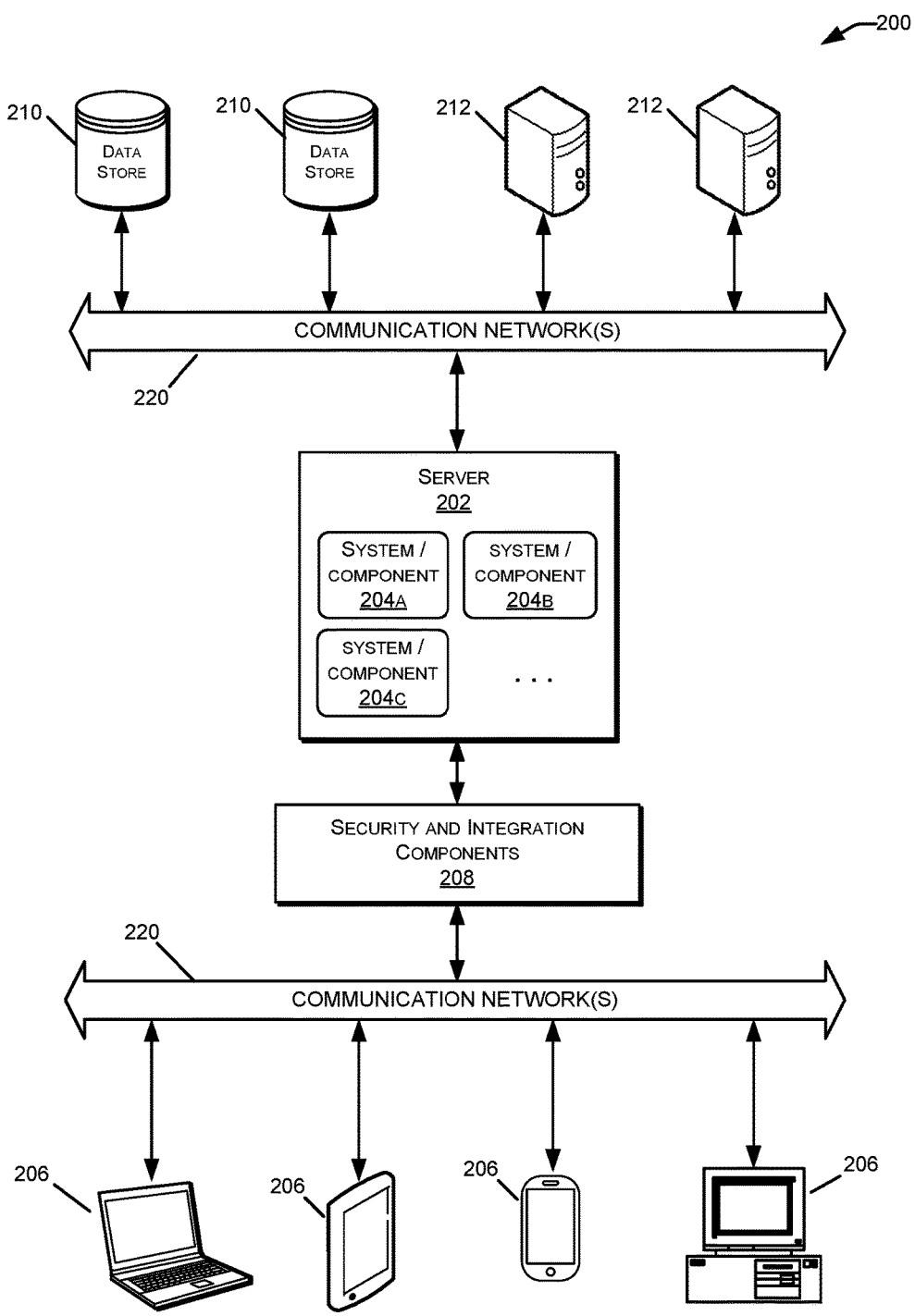
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
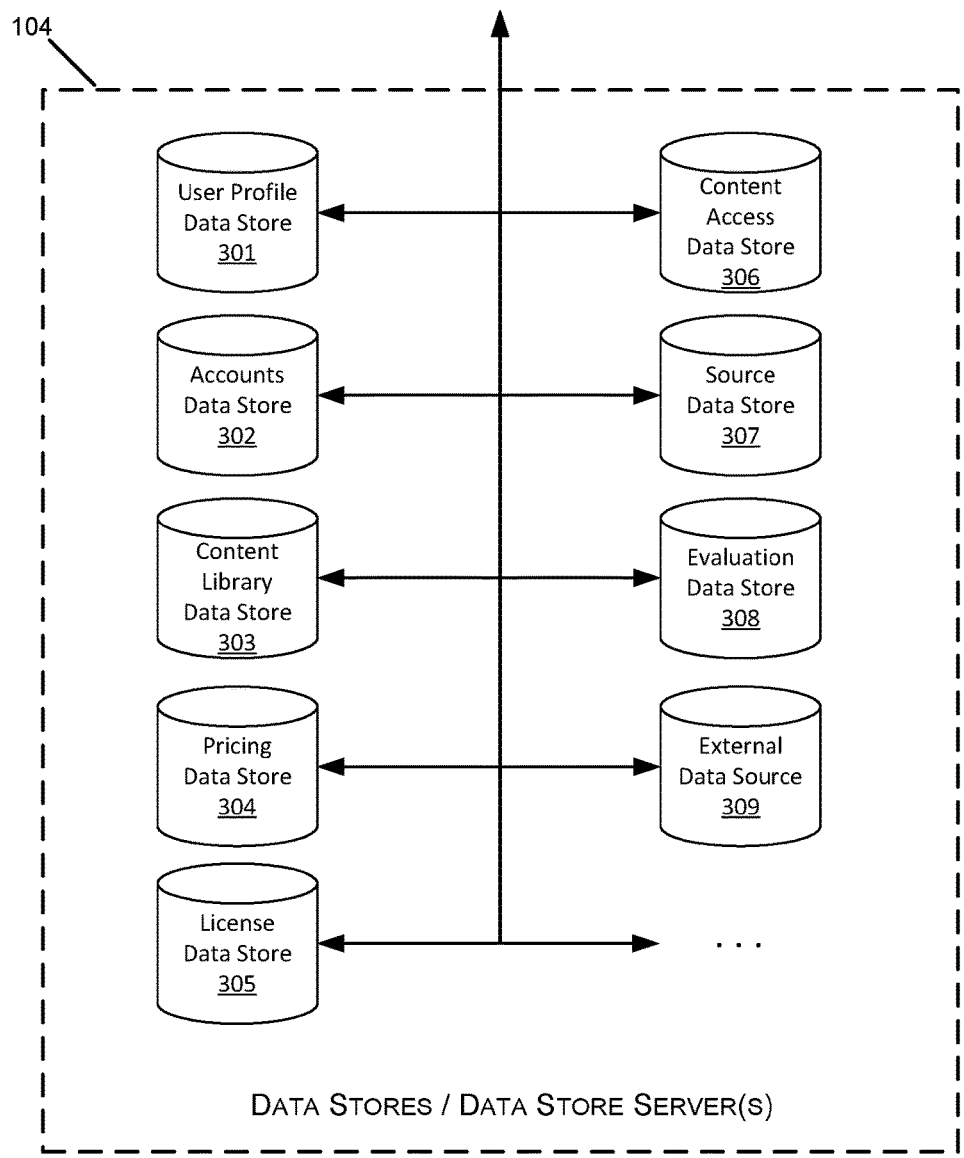
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-309 may reside in storage on a single computer server 104 (or a single server farm or cluster) under the control of a single entity, or may reside on separate servers operated by different entities and/or at remote locations. In some embodiments, data stores 301-309 may be accessed by the content management server 102 and/or other devices and servers within the network 100 (e.g., user devices 106, supervisor devices 110, administrator servers 116, etc.). Access to one or more of the data stores 301-309 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-309, including their functionality and types of data stored therein, are illustrative and non-limiting. Data stores server architecture, design, and the execution of specific data stores 301-309 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301 may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.).

An accounts data store 302 may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303 may include information describing the individual content items (or content resources) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

In addition to the illustrative data stores described above, data store server(s) 104 (e.g., database servers, file-based storage servers, etc.) may include one or more external data aggregators 309. External data aggregators 309 may include third-party data sources accessible to the content management network 100, but not maintained by the content management network 100. External data aggregators 309 may include any electronic information source relating to the users, content resources, or applications of the content distribution network 100. For example, external data aggregators 309 may be third-party data stores containing demographic data, education related data, consumer sales data, health related data, and the like. Illustrative external data aggregators 309 may include, for example, social networking web servers, public records data stores, learning management systems, educational institution servers, business servers, consumer sales data stores, medical record data stores, etc. Data retrieved from various external data aggregators 309 may be used to verify and update user account information, suggest user content, and perform user and content evaluations.

Figure 4:
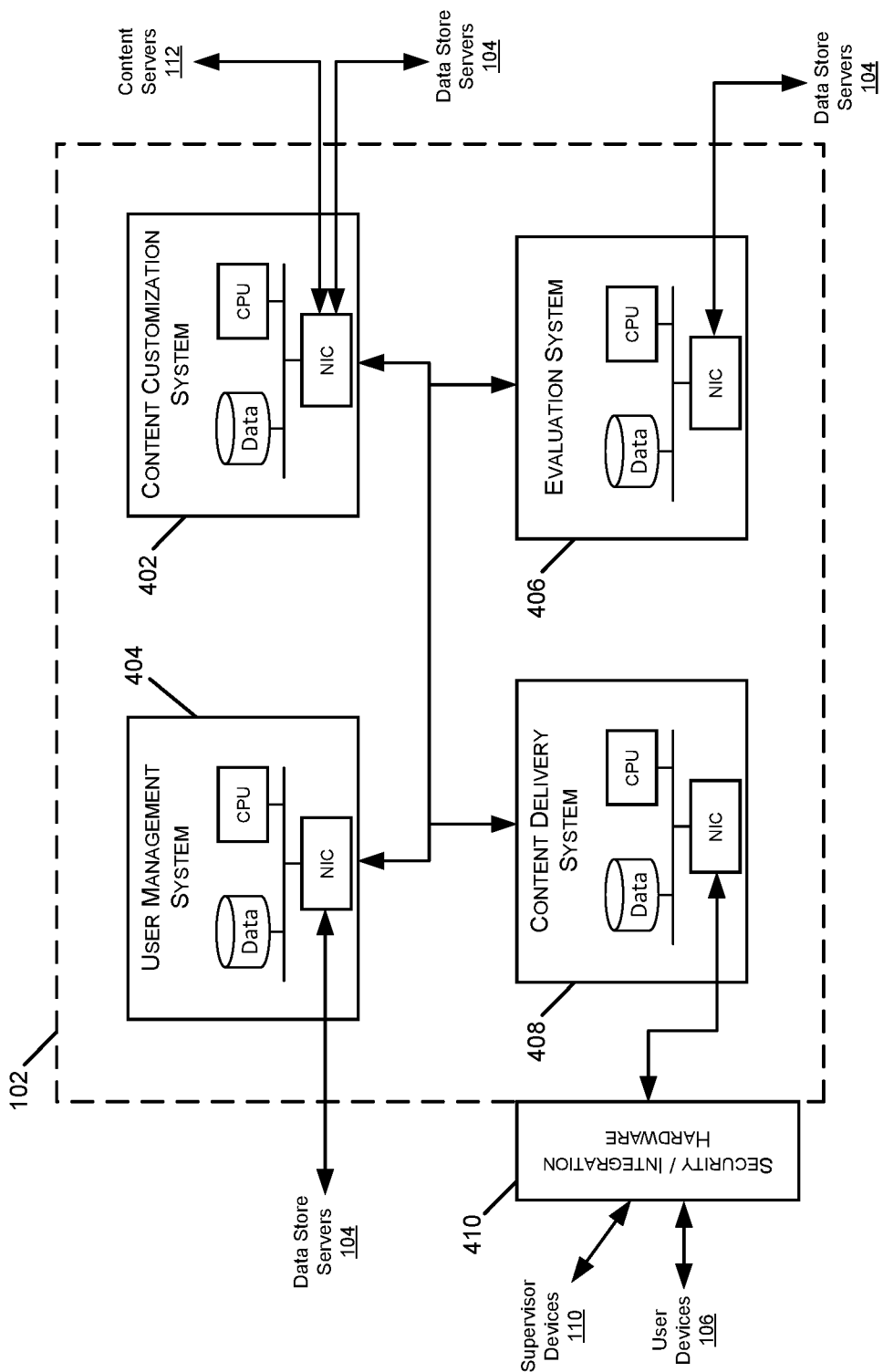
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
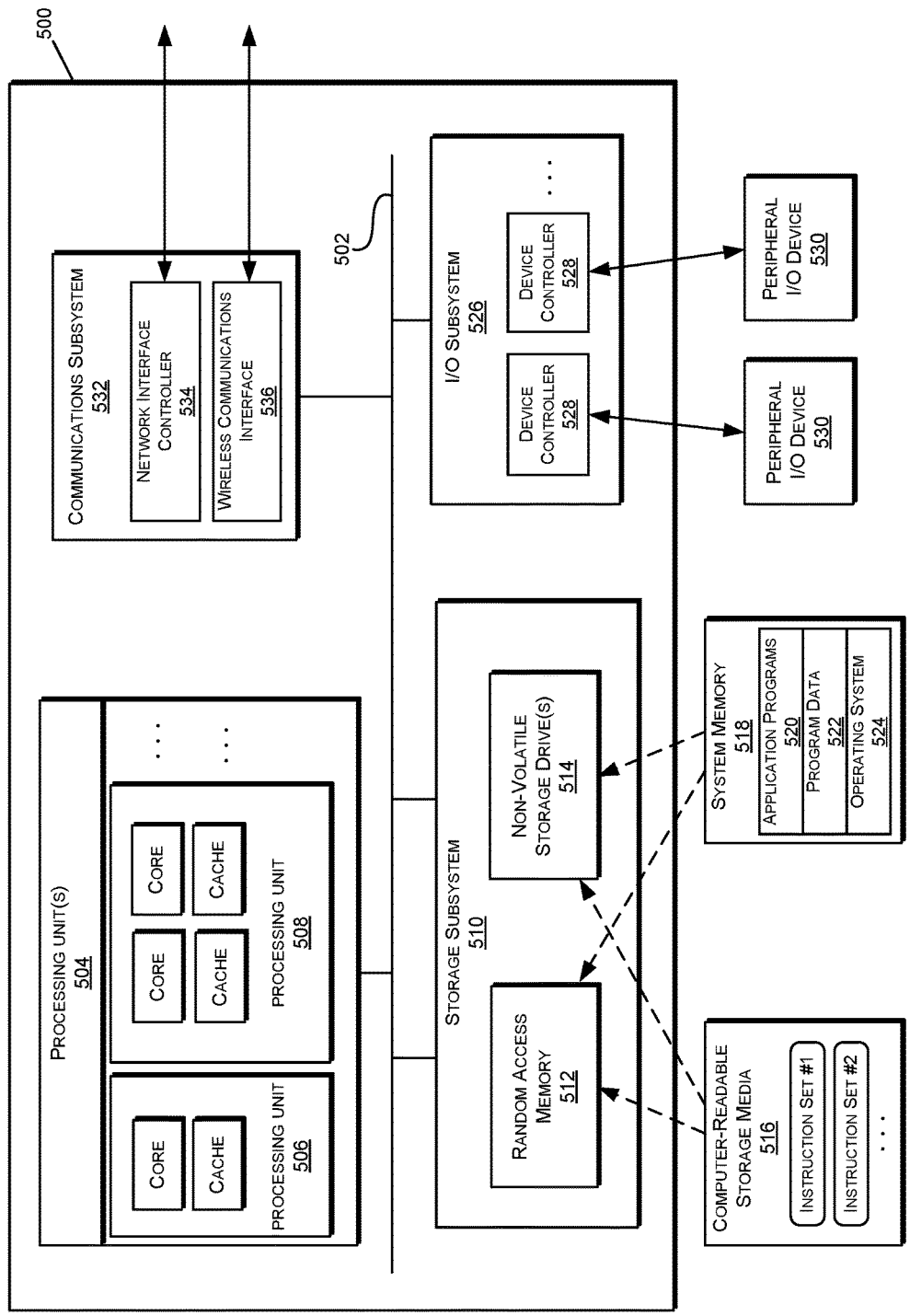
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
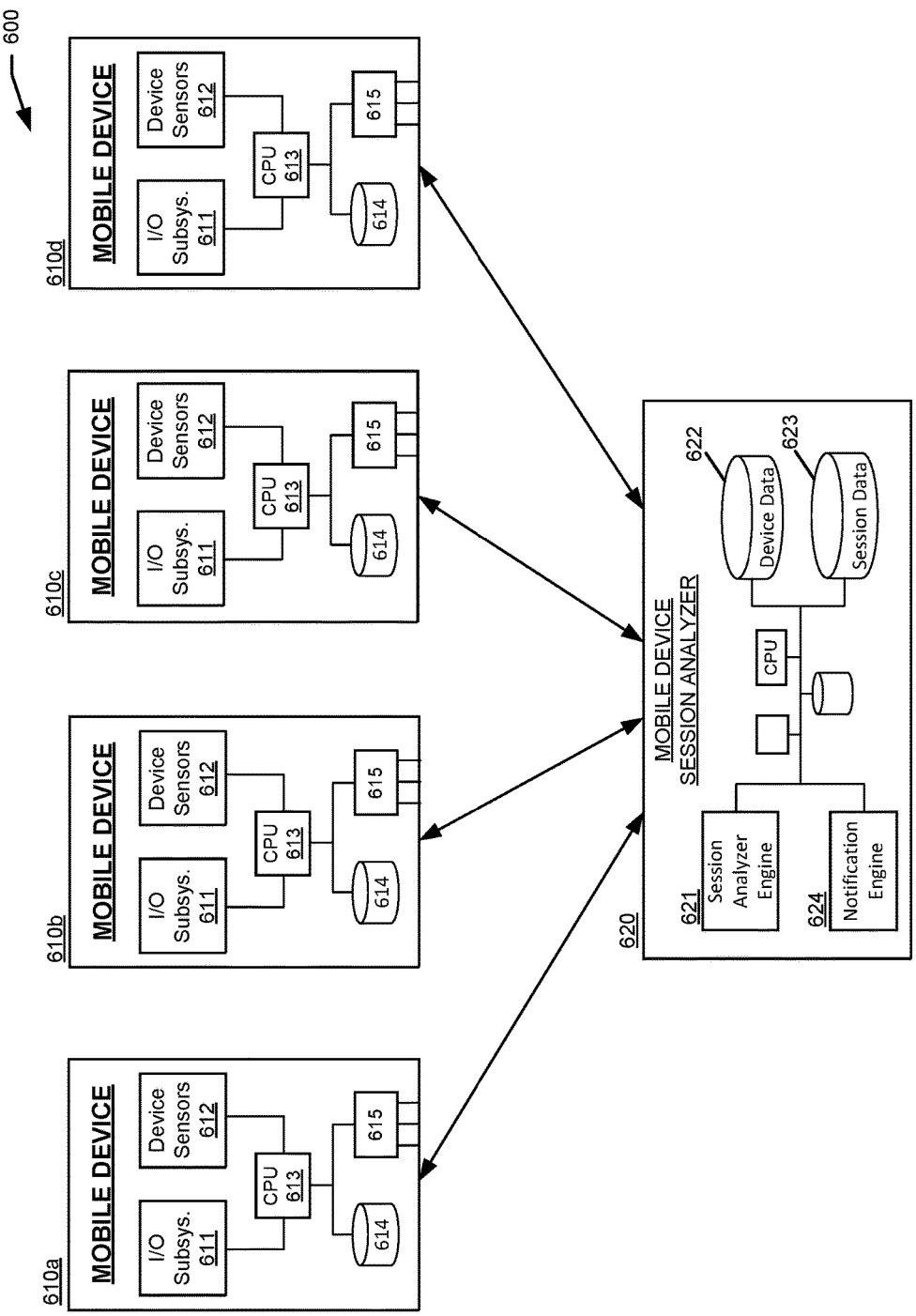
FIG. 6 is a block diagram illustrating an example system including a mobile device session analyzer and a plurality of mobile devices, according to one or more embodiments of the disclosure.

With reference now to FIG. 6, a block diagram is shown illustrating an example of a mobile device session analyzer system 600. As shown in this example, a mobile device session analyzer system 600 may include one or more mobile devices 610 configured to communicate with a mobile device session analyzer 620. As discussed below, mobile devices 610 may be configured to receive and execute content resources via their respective input/output (I/O) subsystems 611. As used herein, a content resource execution session may refer to a continuous time period during which one or more content resources are executed on a mobile device 610. During such content resource execution sessions, a user of the mobile device 610 may consume (e.g., watch, read, play, etc.) the content resources, and may provide feedback relating to the content resources via the I/O subsystem 611. Mobile devices 610 may be configured to receive such user feedback and other relevant performance data associated with content resource execution sessions. The user feedback data and other performance data associated with content resource execution sessions may be received and/or determined before, during, or after the associated execution sessions. Mobile devices 610 also may be configured to detect and/or determine (e.g., using device sensors 612 and/or CPU 613) context data associated with specific content resource execution sessions. Such context data may include, for example, device location, session time, session length, network data, movement and noise data, user biostatistics data, data received from other mobile device applications, and the like. Mobile devices 610 may store the performance data and context data associated with content resource execution sessions, for example, in local data stores 614, and also may transmit such data to one or more session analyzers 620. As discussed in more detail below, session analyzers 620 may include server components and/or processing engines, along with specialized data storage, networking and hardware components, configured to receive and analyze content resource execution session data from the mobile devices 610, and to determine performance conditions for associated users.

In order to perform these features and other functionality described herein, each of the components and sub-components discussed in the example mobile device session analyzer system 600 may correspond to a single computer server or a complex computing system including a combination of computing devices, storage devices, network components, etc. Each of these components and their respective subcomponents may be implemented in hardware, software, or a combination thereof. Certain mobile devices 610 may communicate directly with the session analyzer 620, while other mobile devices 610 may communicate with the session analyzer 620 indirectly via one or more intermediary network components (e.g., routers, gateways, firewalls, etc.) or other devices (e.g., content management servers 102, content servers 112, etc.). Although the physical network components have not been shown in this figure so as not to obscure the other elements depicted in the figure, it should be understood that any of the network hardware components and network architecture designs may be implemented in various embodiments to support communication between the servers and devices in the system 600. Additionally, different mobile devices 610 may use different networks and networks types to communicate with the session analyzer 620, including one or more telecommunications networks, cable networks, satellite networks, cellular networks and other wireless networks, and computer-based IP networks, and the like. Further, certain components within mobile device session analyzer system 600 may include special purpose hardware devices and/or special purpose software, such as those included in I/O subsystems 611 and sensor systems 612 of the mobile devices 610, as well as those within the processing engines and data stores 621-624 of the session analyzer 620, discussed below.

In some embodiments, a mobile device session analyzer system 600 may be integrated within, or configured to operate in collaboration with, one or more content distribution networks 100. For example, system 600 may be the same as, or may operate within or in collaboration with, any of the content distribution network (CDNs) 100 described above. Thus, specific examples of mobile device session analyzer systems 600 may include, without limitation, educational and professional training systems and networks, interactive gaming systems and networks, media distribution systems and networks, and enterprise application systems and networks, websites and other Internet-based systems and networks. In such cases, the mobile device session analyzer 620 may be implemented within one or more content servers 112, content management servers 102, and/or data store servers 104, and mobile devices 610 may correspond to the user devices 106 and 110 described above in reference to CDN 100. Thus, within system 600 (which may also be referred to as CDN 600), mobile devices 610 may request and receive content resources from the session analyzer 620, execute the content resources using the hardware and software components of the user devices 610, and then transmit various user interaction data back to the session analyzer 620. In other examples, session analyzer 620 may be implemented using one or more computer servers, and other specialized hardware and software components, separately from other CDN components such as content servers 112, content management servers 102, data store servers 104, and the like. In these examples, the session analyzer 620 may be configured to communicate directly with mobile devices 610, or indirectly through content management servers 102 and/or other components and communications networks of the CDN 600.

As discussed below, system 600 and other embodiments described herein may be used to execute content resources on user devices 610, receive user inputs via user devices 610 during content resources execution sessions, determine performance measurements and/or corresponding user contexts associated with content resources execution sessions, and analyze content resources execution sessions in order to determine performance conditions for users within the system 600. Content resources may refer to any digital content, such as media content (e.g., music, movies, television programming, audiobooks, advertisements, etc.), gaming software, professional training and eLearning resources (e.g., courses, texts, lectures, interactive modules, tests and evaluations, etc.), as well as websites and other web-based content. Various types of content resources may be transmitted to, stored on, and executed by mobile devices 610 as files, executable software, services, and the like. Users may consume (e.g., view, read, listen to, play, etc.) content resources via compatible mobile devices 610 using the hardware and software resources on the mobile device 610. In some embodiments, the content resources may include interactive resources, such as interactive media, games, or professional training or eLearning content modules, which may be designed to elicit user responses or feedback before, during, or after the execution of the content.

Mobile devices 610 may include laptop computers, smartphones, tablet computers, and other various types of mobile devices, each of which may include some or all of the hardware, software, and networking components discussed above. Specifically, a mobile device 610 may be any computing device with sufficient memory for storing one or more content resources, and sufficient processing and I/O sub-components for executing the content resources. As discussed above, such content resources may include television programming, music, movies, lectures or materials in a training course or eLearning system, and/or gaming content. Accordingly, mobile devices 610 may include the necessary hardware and software components to establish the network interfaces, security and authentication capabilities, and content caching capabilities to receive the content, store the content, and execute the content to provide to users in real-time or at later time. Moreover, in certain embodiments, a single mobile device 610 may have different context data (e.g., location data, network connectivity status data, movement and noise data, etc.) during different content resource execution sessions. Laptop computers, tablet computers, smart phones, smart watches, wearable computing devices, and vehicle-based computing systems are all examples of mobile devices 610 that may change locations and network connectivity status, may detect movement and noise data, and may have other changing context data during a single content resource execution session or between multiple different execution sessions.

In this example, mobile devices 610 each include an I/O subsystem 611, one or more device sensors 612, a processing unit 613, a data store 614, and a network interface controller 615. As discussed above, each mobile device 610 may be configured to receive and execute content resources using their respective I/O subsystems 611. Each I/O subsystem 611 may include hardware and software components to support a specific set of output capabilities (e.g., LCD display screen characteristics, screen size, color display, video driver, speakers, audio driver, graphics processor and drivers, etc.), and a specific set of input capabilities (e.g., keyboard, mouse, touchscreen, voice control, cameras, facial recognition, gesture recognition, etc.). Different mobile devices 610 may support different input and output capabilities within their I/O subsystems 611, and thus different types of content resources may be compatible or incompatible with certain mobile devices 610. For example, certain content resources may require specific types of processors, graphics components, and network components in order to be optimally executed on a mobile device 610. Additionally or alternatively, various content resources may require specific output capabilities (e.g., LCD display screens, minimum screen sizes, color displays, video, audio, graphics, etc.) and/or specific input capabilities (e.g., keyboard, mouse, touchscreen, voice control, gesture recognition, etc.) in order to be optimally executed on a mobile device 610. In some embodiments, users may establish user-specific preferences for executing specific types of content resources on specific types of user devices.

Each mobile device 610 also may include one or more device sensors 612 configured to detect context data associated with specific content resource execution sessions. Context data may include any data describing the current (and/or previous) state of the mobile device 610, the physical environment of the mobile device 610, and/or the user of the mobile device 610, at the time of a content resource execution session. For example, such context data may include the location of the mobile device 610 and any detected movement of the mobile device 610 during a content resource execution session, including speed and overall distance traveled, as well jiggling and vibrating movements indicative of walking, jogging, running, or traveling in cars, busses, or trains, etc. Accordingly, sensors 612 may include accelerometers, speedometers, compasses, gyroscopes, and/or digital positioning systems such as Global Position Satellite (GPS) receivers, in order to detect the position and movement of the device 610 during an execution session. Additional context data may include the orientation of the mobile device 610, ambient noise and/or visual background data detected by the device 610, and temperature and lighting data within the physical environment of the mobile device 610 during an execution session. Thus, sensors 612 also may include thermometers, barometers, light sensors, cameras, microphones, heat sensors, motion sensors, and the like, in order to detect background noises such as traffic, music, conversations, and other potential distractions (e.g., other people nearby, animals, etc.), as well as lighting and temperature factors that may affect performance during an execution session.

In some embodiments, device sensors 612 may include user health and activity sensors, such as heartrate and blood pressure sensors, sleep monitors, and personal exercise/fitness sensors that may detect and track the physical state and condition of the user before and during a content resource execution session. For instance, a mobile device 610 may be a personal and/or wearable computing device configured to detect current health and activity data of a user, and then transmit the biostatistics data for the user to the session analyzer 620 and/or other mobile devices 610 within the system 600. As described below, such biostatistics data, like other session context variables, may be stored and correlated with user performance measurements during content resource execution sessions to determine performance conditions for the user.

It should be understood that the above examples of specific sensors 612 are illustrative and non-limiting only, and that any other mobile device sensor 612 may be activated during content resource execution sessions to detect and record data that may be used to determine user performance conditions based on correlations between user performance measurements and sensor readings during execution sessions. Additionally, as described below, certain types of context data might not require specialized device sensors 612, and thus such sensors 612 may be optional in some embodiments. For example, the context data associated with a content resource execution session may include session time, session length, and current device capabilities and status data such as processor status and availability, memory usage and availability, network availability, etc. Additional context data may be received from other applications executing on the mobile device 610 and/or other related user devices 610. For instance, if a user recently or concurrently activated and/or interacted with certain software applications (e.g., a mobile phone application, music application, gaming application, web browser, etc.) during a content resource execution session, then the user's interactions may be stored as context data which may correlate positively or negatively to the user's performance during the execution session. In addition to application launch states, additional context information may be received from profiles built by applications granted security permissions, as well as phone operating system-level services, from various mobile device and mobile software providers (e.g., GOOGLE, APPLE, MICROSOFT, etc.). Additionally, mobile assistant services (e.g., SIRI, GOOGLE NOW, CORTANA, etc.) also may serve as a potentially rich user profile context source.

After collecting various session data for one or more content resource execution sessions, such as session context variable data and user performance and/or user feedback data, mobile devices 610 may store the session data in a local data store 614 or transmit the session data via a network interface 615 to a mobile device session analyzer 620. As shown in FIG. 6, mobile device session analyzer 620 may receive data relating to multiple content resource execution sessions from multiple different mobile devices 610. The session analyzer 620 may be configured to collect and store mobile device data and session data in one or more data stores 622 and 623. The session analyzer 620 may include one or more processing engines 621 and 624 configured to analyze the session data received from the mobile devices 610 and determine performance conditions for users associated with the session data (e.g., session analyzer engine 621), as well as monitoring the context data of the mobile devices 610 against the user's performance conditions to provide notifications that a user's current context data matches the performance conditions determined for the user (e.g., notification engine 624). The session analyzer engine 621, notification engine 624, and data stores 622-623 may be implemented as separate software (and/or storage) components within a single computer server 620 in some examples, while in other examples may be implemented as separate computer servers/systems having separate dedicated processing units, storage devices, and/or network components.

Referring now to FIGS. 7A and 7B, two tables are shown including example mobile device data (FIG. 7A) and example content resource execution session data (FIG. 7B) that may be illustrative of certain embodiments of the disclosure. In this example, FIG. 7A represents an example mobile device table 710 that may be stored in a device data store 622 of a mobile device session analyzer 620. Table 710 may store a list of device capabilities and/or characteristics for one or more mobile devices 610 within a mobile device session analyzer system 600. For example, table 710 (and/or other tables 710 within a data store 622) may store any hardware and software components and capabilities of the mobile devices 610 (processors, memory systems, network capabilities, drivers, client applications, etc.), the input/output devices 611 and capabilities (e.g., integrated and peripheral I/O devices, I/O software, I/O capabilities, etc.), as well as any device sensors 612 and sensor capabilities. In some examples, session analyzer 620 and/or other components with a CDN 600 may perform a registration process for new mobile devices 610, during which a mobile device 610 may provide its device components, characteristics, and/or capabilities to be enrolled within the CDN and/or session analyzer system 600. In other examples, mobile devices 610 may transmit device characteristics and capabilities data along with transmissions of content resource execution session data, and the session analyzer 620 may extract the data and update table 710 with the received device data. In either case, mobile devices 610 and session analyzers 620 may be respectively configured to transmit and receive/store updates to the device data for a mobile device 610. For instance, updated device data may be transmitted by a mobile device 610 in response to hardware or software upgrades to the mobile device 610, or the installation or removal of a peripheral I/O device 611, sensor 612, etc. The session analyzer 620 may receive device data updates from mobile devices 610 and update device data table 710 as needed.

FIG. 7B represents an example mobile device session table 720 that may be stored in a session data store 623 of a mobile device session analyzer 620. Session data store 623 may include various data tables 720 containing data relating to content resource execution sessions performed by users via mobile devices 610. As shown in this example, mobile device session table 720 (and/or other tables 710 within data store 623) may store, for each content resource execution session, a session identifier, a user identifier (i.e., corresponding to the user that initiated the content resource execution session), a device identifier (i.e., corresponding to the mobile device 610 on which the user content resource session was executed), and one or more content resource identifiers (i.e., corresponding to the specific content resource(s) executed during the session). The table 720 also may include one or more context data associated with each content resource execution session, such as session time, session length, session location, and/or any of the additional context data discussed herein for content resource execution sessions. Finally, example table 720 includes session performance data corresponding to one or more performance measurements of the user associated with the content resource execution sessions. Such performance measurements, discussed in detail below, may be based on data such as user feedback, user interactions, user consumption velocities and remediation rates, etc.

Figure 8:
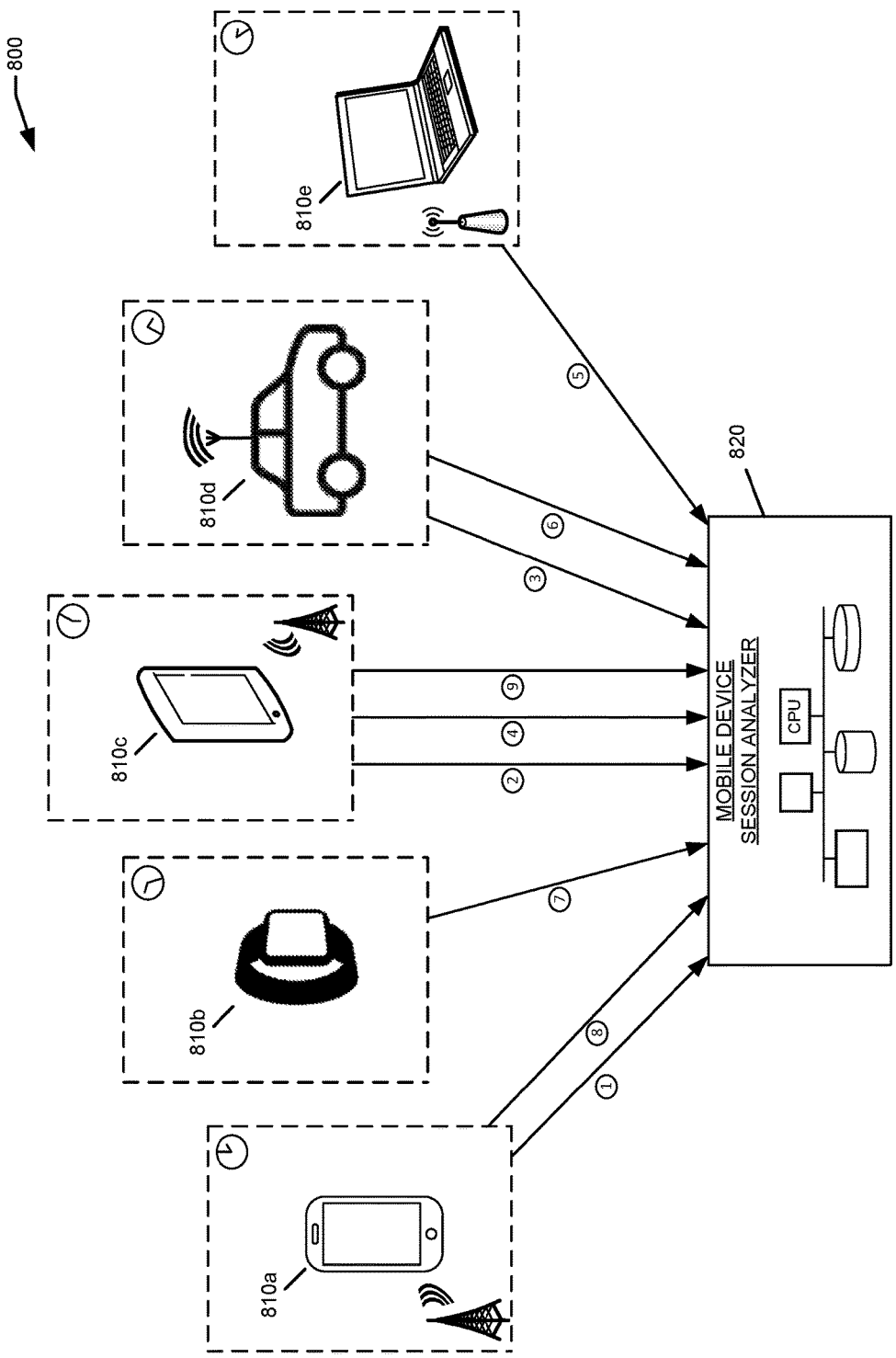
FIG. 8 is a block diagram illustrating another example system including a mobile device session analyzer and a plurality of mobile devices, according to one or more embodiments of the disclosure.

Referring now to FIG. 8, an example diagram is shown illustrating a sequence of data transmissions from mobile devices 810 to a mobile device session analyzer 820, where each data transmission may include data relating to a content resource execution session performed by a user on the mobile device 810. The architecture and hardware/software components of system 800 may be similar (or identical) to those in system 600, discussed above. For example, each mobile device 810 may correspond to a mobile device 610, and session analyzer 820 may correspond to session analyzer 620. However, FIG. 8 illustrates specific examples of different mobile devices 810 associated with a user, and specific examples of transmitting execution session data from the mobile devices 810. In this case, a user may use five different mobile devices 810 at various different times to execute content resources: a smartphone 810a, a smartwatch 810b, a tablet computer 810c, a vehicle-based computer system 810d, and a laptop computer 810e. As discussed above, each mobile device 810 may have different device characteristics and capabilities, which may be stored by the individual devices 810 and/or within a data store of the session analyzer 820.

FIG. 8 also illustrates a sequence of data transmissions (1-9) from the individual mobile devices 810 to the mobile device session analyzer server 820. Each data transmission (1-9) may contain information describing one or more content resource execution sessions performed by a user on the mobile device 810. The data transmitted from mobile devices 810 during data transmissions (1-9) may include similar data to that discussed above in reference to FIG. 7B, for example, user identifiers, device identifiers, content resource identifiers, context data in the form of session context variable and value pairs (e.g., session time and value, session length and value, session location and value, network type and value, network speed and value, etc.), and/or session performance data indicating performance measurements of the user during the content resource execution sessions. As illustrated in this example, the context data for each mobile device 810 may change over time, as the mobile devices 810 may change locations, users, networks, etc. Thus, each data transmission (1-9) may include a unique combination of device data, user data, time data, location data, and/or network data, as well as additional unique context data and session performance data.

Figure 9:
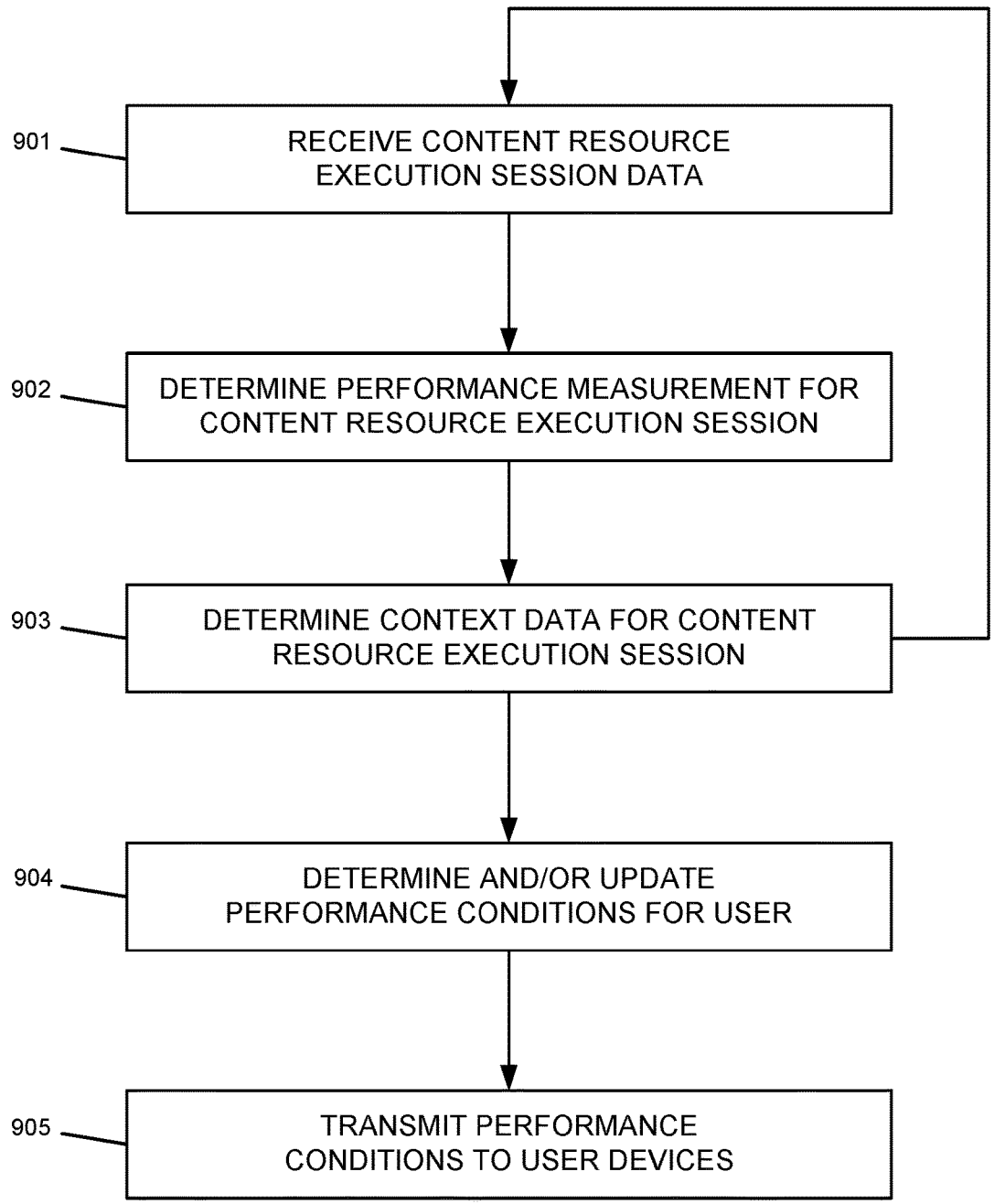
FIG. 9 is a flow diagram illustrating an example process of determining performance conditions corresponding to a user's content resource execution sessions, according to one or more embodiments of the disclosure.

Referring now to FIG. 9, a flow diagram is shown illustrating a process of determining one or more performance conditions associated with a user, based on a user's content resource execution sessions. As described below, the steps in this process may be performed by one or more components in the mobile device session analyzer systems 600 described above, such as a mobile device 610 and/or a session analyzer server 620. Prior to the steps of FIG. 9, discussed below, a mobile device 610 may request and receive a set of content resources, for example, from a content management server 102 or content server 112 (either of which may be implemented within a session analyzer server 620), or other content repository. Content resources may include any digital content that may be executed on a user device 610, such as media content (e.g., music, movies, television programming, audiobooks, advertisements, etc.), gaming software, professional training and eLearning resources (e.g., online courses, texts, video lectures, interactive software modules, tests and evaluations, etc.), as well as websites and other web-based content. Different types of content resources may be transmitted to, stored on, and executed by mobile devices 610 as files, executable software, services, and the like.

During the execution of one or more content resources by a user, which may be referred to as a content resources execution session, the user may consume (e.g., view, read, listen to, play, etc.) and interact with the content resources using the hardware and software components of their mobile devices 610 (e.g., I/O subsystems 611). As discussed above, different mobile devices 610 may have different I/O subsystems 611 and other hardware, software, and network differences that support different types of resource consumption and resource interaction behaviors by users.

Additionally, during a content resource execution session, a mobile device 610 may collect and store various data relating to the execution session. For example, the mobile device 610 may store basic session data, such as user that requested and executed the resources, the specific resources executed, the session time, etc. The mobile device 610 also may detect and store various context data during execution sessions, including the location of the mobile device 610 and other physical environment data (e.g., movement data, noise data, lighting data, temperature data, etc.), user biostatistics data (e.g., heartrate, blood pressure, sleep data, diet data, exercise/fitness data, etc.), data received from other applications on the mobile device 610 or other user devices 610 (e.g., phone application data, music application data, gaming data, web browsing data, etc.), as well as other sensor data and any additional context data discussed herein.

The mobile device 610 also may collect and store user feedback and other user interaction data during execution sessions. User feedback and user interaction data may be received via the I/O subsystem 611 of the mobile device 610 executing the content, or in other cases may be received via the input and output components of a different user device. For example, in some embodiments, content may be executed/played on one device (e.g., a television, classroom or conference room projector, audio system, etc.), and the user may interact with the content and provides feedback via a different device (e.g., a smartphone, personal tablet or laptop, etc.). The user interaction data collected and stored by the mobile device 610 during an execution session may include user selections of content resources (e.g., starting, stopping, pausing, skipping forward or back, replaying sections, etc.), user responses to decision/navigation points within interactive user content resources, user behaviors while consuming content resources (e.g., text inputs, audio responses, gestures, facial expressions, body language, etc.), scores of user interactions (e.g., user scores of game levels, eLearning modules, tests or evaluations, etc.), and/or the user's answers to explicit requests for feedback or evaluations of content resources. Such user interaction data may be referred to as clickstream processing in some cases. Additional user interaction data may include data metrics relating to a user's interaction with the content, such as amount of time taken for the user to make a selection, the number of selections/attempts the user makes at a given navigation point, and any aids, tools, or help that the user used when interacting with the content.

In some embodiments, some or all of the data collected and stored by mobile devices 610 during content resource execution sessions, including session data, context data, and/or user interaction data, etc., may be transmitted by the mobile devices 610 to the session analyzer 620 during or after the execution sessions, as shown in FIG. 8. In such embodiments, the session analyzer 620 may receive content resource execution session data from multiple devices 610, and may perform the steps of FIG. 9 on the aggregated data from multiple devices 610. In other embodiments, the mobile devices 610 may perform certain steps and analyses, such as user performance measurements, evaluations of context data to identify potential distractions and other relevant factors, before transmitting data to the session analyzer 620. In still other examples, each mobile device 610 may perform each of the steps and FIG. 9 individually, without any communication with a session analyzer server 620. The mobile device session analyzer 620 may be optional in such cases, and mobile devices 610 may communicate directly with each other, or need not communicate at all and each mobile device 610 may determine its own device-specific performance conditions for the user.

In step 901, data relating to one or more content resource execution sessions may be received, for example, by a mobile device session analyzer 620 from one or more mobile devices 610. As discussed above, the data received in step 901 may include session data (e.g., user identifier, resource identifiers, execution times, etc.), various types of context data (e.g., location data, physical environment data, user biostatistics data, data received from other applications, etc.), user interaction data received by the mobile device 610, and any other data collected in connection with an execution of content resources on the mobile device 610.

In step 902, one or more user performance measurements may be determined for the content resource execution session. In some embodiments, a mobile device 610 and/or mobile device session analyzer 620 may calculate user performance with respect to content resource execution sessions based on the user interaction data received in step 901. Several different types and techniques of performance measurements may be determined in different embodiments and/or based on different types of content resources. In some cases, a performance measurement may correspond to a user score or evaluation. For example, gaming software, professional training or eLearning software, and other content resources may calculate user scores for game levels, comprehension levels of eLearning modules, automated online tests, etc. User scores for interactive content resources may be calculated during the execution of the resources (e.g., for an interactive game) or after the completion of the execution session (e.g., for a training/eLearning module), and in some cases the evaluation/scoring process may be performed at a different mobile device 610 then the device executing the resources.

Other types of performance measurement that may be determined in step 902 may include express feedback from the user regarding the content resources, such as user content ratings, discussion posts, content evaluations, and the like. For instance, certain CDNs 100 and/or specific content resources may solicit user ratings during or after execution of the content (e.g., movie and television program ratings, game reviews, training/eLearning module ratings, course ratings, instructor ratings, etc.). Additional user feedback that may be collected for performance measurements may include the amount of time the user played/executed the resources, a record of the user decisions and other interactions during the execution of the resources, and audio and/or visual cues (e.g., voice feedback, facial expressions, gestures, body language, etc.) which may be collected and stored by the mobile device 610 during the execution of the content resources.

Additionally, in some embodiments, the velocity and/or the remediation rate of a user during one or more content resource execution sessions may be determined and used as a user performance measurement in step 902. Consumption velocity may refer to the speed at which a user consumes content resources, and remediation rate may refer to the rate at which the user returns to previously consumed/executed content during the execution session. To illustrate, a first user who quickly consumes and completes one or more media resources, game levels, eLearning modules, and the like, may be assigned a high consumption velocity for the content resource execution session, whereas a second user who proceeds slowly through the content resources (e.g., frequently pausing, repeating portions or sections multiple times, selecting all possible choices or answers in an interactive resource, etc.) may be assigned a low consumption velocity. However, if the first user (or another user) returns frequently to previously viewed/executed resources, then the first user may be assigned a high remediation rate, whereas if the second user (or another user) rarely returns to a content resource after completing it, then the second user may be assigned a low remediation rate. Consumption velocities and/or remediation rates for a user during one or more execution sessions may be calculated based on the overall times required to complete resources, the numbers of user decisions/interactions during execution sessions, and/or numbers or rates of resource consumption, etc.

In step 903, one or more items of context data may be determined for the content resource execution session, based on the data received in step 901. In some embodiments, context data may be collected and determined by one or more mobile devices 610, a mobile device session analyzer 620, or a combination of mobile devices 610 and session analyzers 620. The context data determined in step 903 may include any of the various types of context data discussed above, for example, device location data, device movement data, data relating to the physical environment of the device 610 (e.g., noise, lighting, other distractions), user biostatistics data, data received from other software applications relating to mobile device 610 or the user.

In some examples, the mobile device 610 may detect certain raw context data using device sensors 612, such as location data, movement data, noise data, image data, user biostatistics data, and the like, and then transmit the raw context data to the session analyzer 620 for analysis and classification. For instance, the mobile device 610 may collect and transmit raw time data corresponding to a content resource execution session (e.g., start time, stop time, user interaction times), and the session analyzer 620 may use the raw time data to classify the execution session into one or more time ranges (e.g., morning, afternoon, evening, etc.). Similarly, the mobile device 610 may collect and transmit raw location data for an execution session, and the session analyzer 620 may analyze the raw execution data to determine a location or location (e.g., home, work, school, library, vehicle, coffee shop, etc.). The session analyzer 620 also may analyze location and/or movement data (e.g., accelerometer readings, gyroscope readings, etc.) to determine user activity context data (e.g., jogging, driving, bus, train, or air travel, etc.). As another example, the mobile device 610 may collect and transmit raw noise data, light data, and/or image data, and the session analyzer 620 may analyze the data to identify distraction context data (e.g., ambient noise levels, music, background conversations, high/low lighting conditions, etc.).

As illustrated in these examples, the mobile device session analyzer 620 may receive and analyze raw context data from mobile devices 610, and then group and/or classify the context data into ranges in order to characterize an execution session as having a particular context. In some cases, the session analyzer 620 may determine context data pairs, each pair consisting of a session context variable (e.g., time, location, movement pattern, noise level, distractions, network connectivity, etc.) and a value or value range for the session context variable. Examples of values or value ranges for a time session context variable may include, for instance, 7:30 am, 2:00 pm-4:30 pm, weekday morning, Sunday afternoon, after school in summertime, holiday weekend, etc. Examples of values or value ranges for an ambient noise session context variable may include, for instance, silence, quiet background music, background conversation, loud music, traffic noise, pet noise, etc. Additionally illustrative examples of session context variables and corresponding values may be found in the first two columns of table 1010 in FIG. 10A.

In some cases, the session analyzer 620 may determine certain types of context data for a mobile device 610 without receiving any raw context data or other context information from the mobile device 610. For example, the relevant context data for an execution session may include the capabilities and characteristics of the mobile device 610, which may be stored in a device data store 622 (or other storage system) and need not be transmitted by the mobile device 610. Additionally, the session analyzer 620 may use some context data received from a mobile device 610, and then access one or more external servers to determine additional context data. For instance, location data received from a mobile device may be used by the session analyzer 620 to access external data sources to determine characteristics about the location (e.g., public or private, type of business, etc.), along with current weather conditions at the location, traffic and road conditions at the location, and the like, so that the mobile device 610 need not transmit this additional context data as well.

Also, for a content resource execution session performed on one mobile device 610a, the session analyzer 620 may receive or retrieve context data from other mobile devices 610b-610d associated with the same user. For example, if a user executes a set of content resources on a first mobile device 610a that does not include certain device sensors 611 (e.g., a GPS receiver, movement sensors, microphones, cameras, etc.), then another mobile device 610b located near the first device 610a may be activated to detect, store, and transmit the relevant context data (e.g., location data, movement data, audio data, image/video data, etc.). In such cases, the other mobile device 610b may transmit the context data to the first mobile device 610a, or directly to the session analyzer 620. Additionally, certain software applications currently running (or recently ran) on the user's other devices 610b may provide relevant context data for an execution session on the first mobile device 610a. For instance, if a user is executing a set of content resources on a first mobile device 610a, while at the same time using the telephone application, music player, gaming applications, and/or web browser on the user's other devices 610b-610d, then these devices may provide the relevant application information to the session analyzer 620 as well. In some embodiments, the session analyzer 620 may be configured to request and/or receive context data from any other user devices 610 positioned near the mobile device 610a during the same time window as an execution session.

As shown in FIG. 9, steps 901-903 may be repeated multiple times before the performance conditions for a user are calculated in step 904. In some cases, a minimum threshold of content resource execution session data, including both user performance data and session context data, may be required before performance conditions can be calculated with statistical reliability. Additionally, even after a set of performance conditions is initially calculated for a user in step 904, the user may continue to perform content resource execution sessions on the user's mobile devices 610. In such cases, steps 901-903 may continue to be performed for any newly received execution session data, and step 904 may be performed again to update the user's performance conditions based on the newly received data.

In step 904, one or more performance conditions may be determined for a user, based on the content resource execution session data received and analyzed in steps 901-903. As used herein, a performance condition for a user may refer to a statistical correlation between a value or range of values of a session context variable, and a predicted effect on the user's performance during content resource execution sessions. For example, a performance condition for a user may correlate a particular time of day to a higher or lower level of performance by the user during content resource execution sessions. Other example performance conditions may correlate specific locations (or types of locations), movement data, background noise (e.g., types of noise and/or noise levels), temperatures, etc., to higher or lower levels of performance by the user during execution sessions.

Referring briefly to FIGS. 10A and 10B, two example tables are shown including illustrative performance condition data. FIG. 10A is an example performance condition table 1010 listing a set of illustrative performance conditions for a user. In this example, each performance condition listed in table 1010 includes a session context variable, a value (or range of values) for the session context variable, and a corresponding predicted performance effect for the user. In this example, the user's performance during content resource execution sessions may be calculated on a point scale from 0 to 100. The Performance +/− column in table 1010 lists the predicted performance increase or decrease for the user, when the context of an execution session is within the identified value/range for the identified context variable. For instance, when the user in this example executes content resources on weekday mornings the user's predicted performance will be 4.5 points higher than it otherwise would, and when the user executes the content resources at home the user's predicted performance will be 8.6 points higher than it otherwise would. However, when the user executes content resources in an environment with ambient noise ranging between 60-65 dB, the user's predicted performance will be 6.7 points lower than it otherwise would, and when the user slept only 4-6 hours the previous night the user's predicted performance will be 2.0 points lower than it otherwise would, and so on. It should be understood that the examples of performance conditions shown in FIG. 10A are illustrative only and non-limiting, and in various embodiments performance conditions may be based on any context data type, factor, and/or value or range discussed herein.

Certain performance conditions determined in step 904 may be applicable to individual users, while other performance conditions may be applicable to groups of users, such as a group of family members, roommates, coworkers, or all users within a CDN 600. Additionally, certain performance conditions determined in step 904 may be applicable to specific CDNs 600 and/or specific types of resources within CDNs 600. For example, as shown in FIG. 10B, performance condition table 1010 may include performance conditions determined based on an analysis of the content resource execution sessions of a single user ("User A") within a single gaming application ("Game ABC") of an online gaming CDN 600. As this example illustrates, a single user may have different sets of performance conditions applicable to different types of CDN (e.g., media distribution CDNs, professional training/eLearning CDNs, gaming CDNs, etc.) and for different content resource types within one or more CDNs 600.

In order to determine the performance conditions in step 904, the session analyzer 620 (or mobile device 610) may execute statistical analysis techniques to identify a session context variable, isolate the variable and the value or range of values for the variable, and calculate the performance effect of the variable and value/range. For example, the session analyzer 620 may use regression analyses to control for the performance effects of other session context variables, thereby isolating a single variable and single value/range for the variable, while effectively holding constant the other possible variables affecting user performance during the execution sessions. After removing the potential performance effects caused by other session context variables via regression analysis, the effect caused by one isolated variable may be calculated to determine the performance +/− of that variable. Similar regressions may be used to isolate analyze the performance effect caused by all session context variables, and performance effect calculations may be done for one or more different values, groups, or ranges for each variable. Such calculations also may take into account (e.g., control for) the difficulty of the content resources executed during a session, based on performance data from other users executing the same resources and/or the performance of the user executing other similar resources.

In step 905, the performance conditions determined in step 904 may be transmitted to one or more user devices. In some cases, reports including a listing of performance conditions may be generated and transmitted to various client devices, as well as instructor/administrator devices associated with the users. Thus, users, system administrators, instructors or teachers, and/or managers may receive performance condition data for users, allowing users of each role to adjust future behaviors relating to the presentation or consumption of content resources. For example, a distributor or presenter of online gaming content, certain media resources, or a professional training/eLearning resources may require users to use mobile devices having specific device capabilities, or to execute resources at certain times/places, etc., based on the determined performance conditions. Similarly, users consuming resources may alter consumption patterns based on the determined performance conditions. Additionally, as discussed below in reference to FIGS. 11-14, after a set of performance conditions have been determined for a user, the current context of the user and the user's devices 610 may be monitored in order to provide notifications and suggestions to the user for executing certain content resources at certain times. In some such embodiments, pairs of session context variables and values/ranges may be transmitted to individual mobile devices 610, so that the mobile devices 610 may periodically test the received pairs of session context variables and values/ranges against the current context data of the user, device, and environment.

Figure 11:
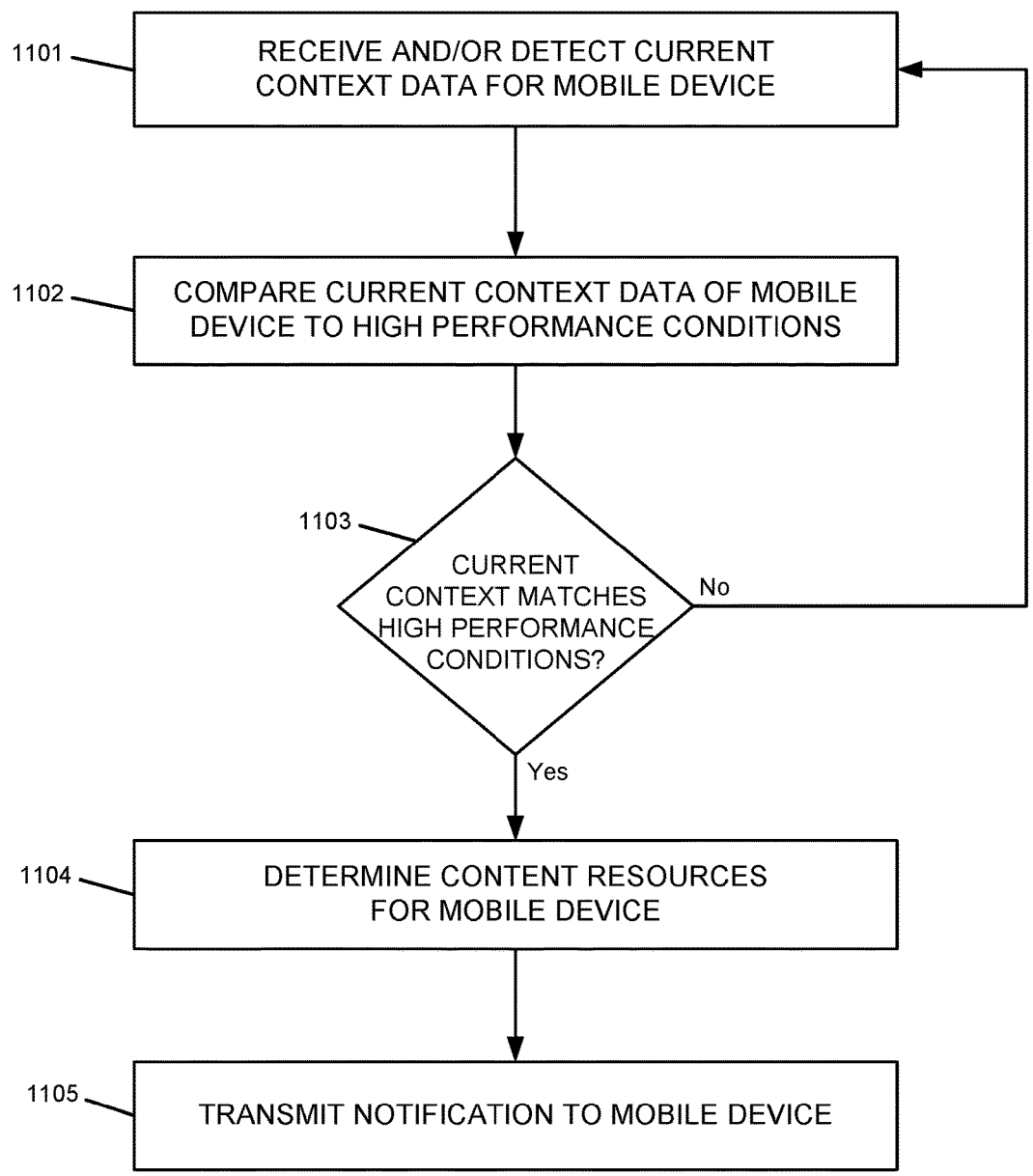
FIG. 11 is a flow diagram illustrating an example process of determining a set of content resources based on the current context data of a mobile device, according to one or more embodiments of the disclosure.

Referring now to FIG. 11, a flow diagram is shown illustrating an example process of determining a set of content resources based on the current context data of a mobile device. As described below, the steps in this process may be performed by one or more components in the mobile device session analyzer systems 600 described above, such as a session analyzer server 620 and/or mobile device 610. Steps 1101-1105 may be performed after the determination of performance conditions for one or more users, based on analyses of previous content resource execution sessions by the users. As noted above, certain performance conditions may be user specific, CDN specific, resource type-specific, and/or device specific, while other performance conditions may apply to multiple users, CDNs, resource types, and/or devices. Accordingly, the performance conditions discussed in steps 1101-1105 may include both user-, CDN-, resource type-, and device-specific performance conditions, as well as performance conditions applying to multiple users, CDNs, resource types, and devices.

In step 1101, the session analyzer 620 may receive and/or detect a current context data of a mobile device 610. For example, the session analyzer 620 may receive periodic transmissions of context data from a mobile device 610a. The session analyzer 620 may determine and/or retrieve additional context data for the mobile device 610a using other techniques described above, such as retrieving context data from local data stores 622, other mobile devices 610, and/or external data sources.

In step 1102, the session analyzer 620 may compare the current context data of the mobile device 610a to the previously determined performance conditions associated with the user and/or the mobile device 610a. For instance, if a user has one or more performance conditions based on time, location, device movement, and background noise, then the session analyzer 620 in step 1102 may compare the session context variable values for these performance conditions to the current context data of the user's mobile devices 610. In some cases, the session analyzer 620 may sum (or otherwise combine) the anticipated performance effect for multiple different performance conditions. Referring again to example table 101, if the current context data received in step 1101 indicates that the current time is Tuesday at 10:00 am (+4.5), the user is currently travelling in his/her vehicle (−1.5), and current using his/her smartphone (−4.3), then the session analyzer 620 may sum these matching performance conditions to determine an anticipated net negative effect (4.5−1.5−4.3=−1.3) on user performance for the current context. As another example, if the current context data received in step 1101 indicates that the current time is Thursday at 8:00 am (+4.5), the user is currently at home (+8.6), and is current using a touchscreen device (+7.3), then the session analyzer 620 may sum these matching performance conditions to determine an anticipated net positive effect (4.5+8.6+7.3=20.4) on user performance for the current context.

In step 1103, if the session analyzer 620 determines that overall current context data of the user and/or mobile device 610a corresponds to an anticipated net positive effect on user performance (1103: Yes), then the session analyzer 620 may determine a set of content resources (step 1104) and transmit a notification to the user's mobile device 610 (step 1105), as discussed below. To the contrary, if the session analyzer 620 determines that overall current context data of the user and/or mobile device 610a corresponds to an anticipated net negative effect on user performance, or to an insufficiently net positive effect that does not reach a minimum threshold (1103: No), then the session analyzer 620 would not transmit a notification to the user's mobile device 610 but would return to step 1101 to await updated context data from the mobile device 610.

In step 1104, after determining that the current context data of the user and/or mobile device 610a corresponds to an anticipated net positive effect on user performance, then the session analyzer 620 may determine one or more content resources to suggest to the user. In some cases, the session analyzer 620 may select the next content resource(s) in a sequence of content resources being executed by the user, such as television program episodes, sequential game levels, sequential eLearning modules, etc. Additionally, as noted above, certain performance conditions may be CDN-specific and/or resource type-specific performance conditions. Therefore, the determination of content resources in step 1104 may be performed by analyzing the subset of performance conditions relating to the specific CDN and/or resource type. For instance, referring again to FIGS. 10A-10B, a calculation of an anticipated net positive effect on user performance in this example may be applicable only for User A, and only for Game ABC on the gaming CDN. Thus, steps 1103 and 1104 may include determining a highest anticipated net positive effect on user performance among different CDNs and/or resource types, based on the same set of current context data.

In step 1105, the session analyzer 620 may transmit a notification to the user's mobile device 610a indicating that the current context of the mobile device 610a is correlated with high user performance. For example, email, text message, or application-based notifications may be sent in real-time or near real-time to the user's mobile device 610a and/or other nearby mobile devices 610. Such transmissions may indicate to the user that the current context data (e.g., user state, device state, physical environment, etc.) corresponds to general high-performance conditions for the user, or may include one or more suggestions of the specific content resources determined step 1104, which may have the highest anticipated performance conditions for the user.

Figure 13:
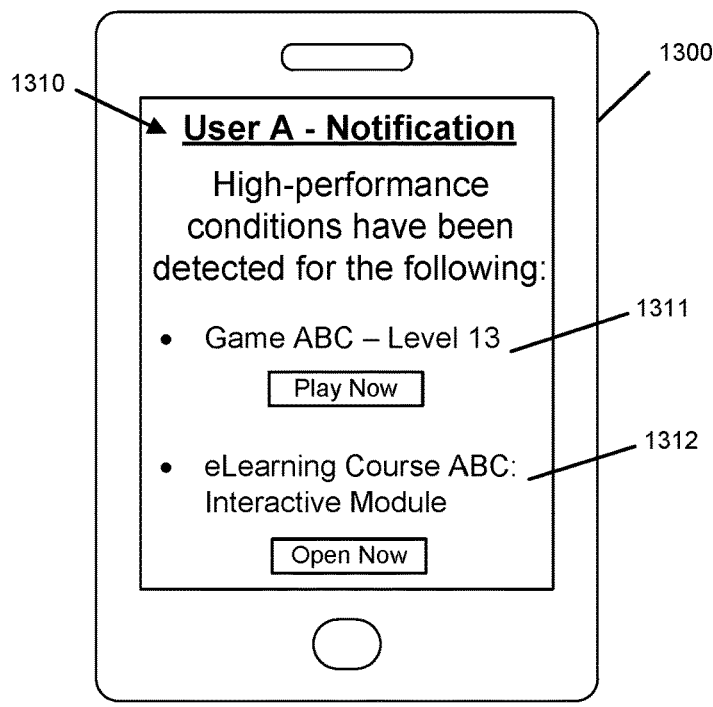
FIG. 13 is an illustrative user interface of a mobile device providing a notification to a user in response to evaluating the performance conditions for the user based on the current context data of the mobile device, according to one or more embodiments of the disclosure.

Referring briefly to FIG. 13, an example of a user interface screen 1310 is shown notifying the user that the current context data for the user and/or mobile device 1300 is correlated with a high level of user performance for executing content resources on the mobile device 1300. The notification 1310 also includes two suggestions of specific content resources 1311 and 1312 that correspond to the highest anticipated user performance conditions for the current context data.

Figure 12:
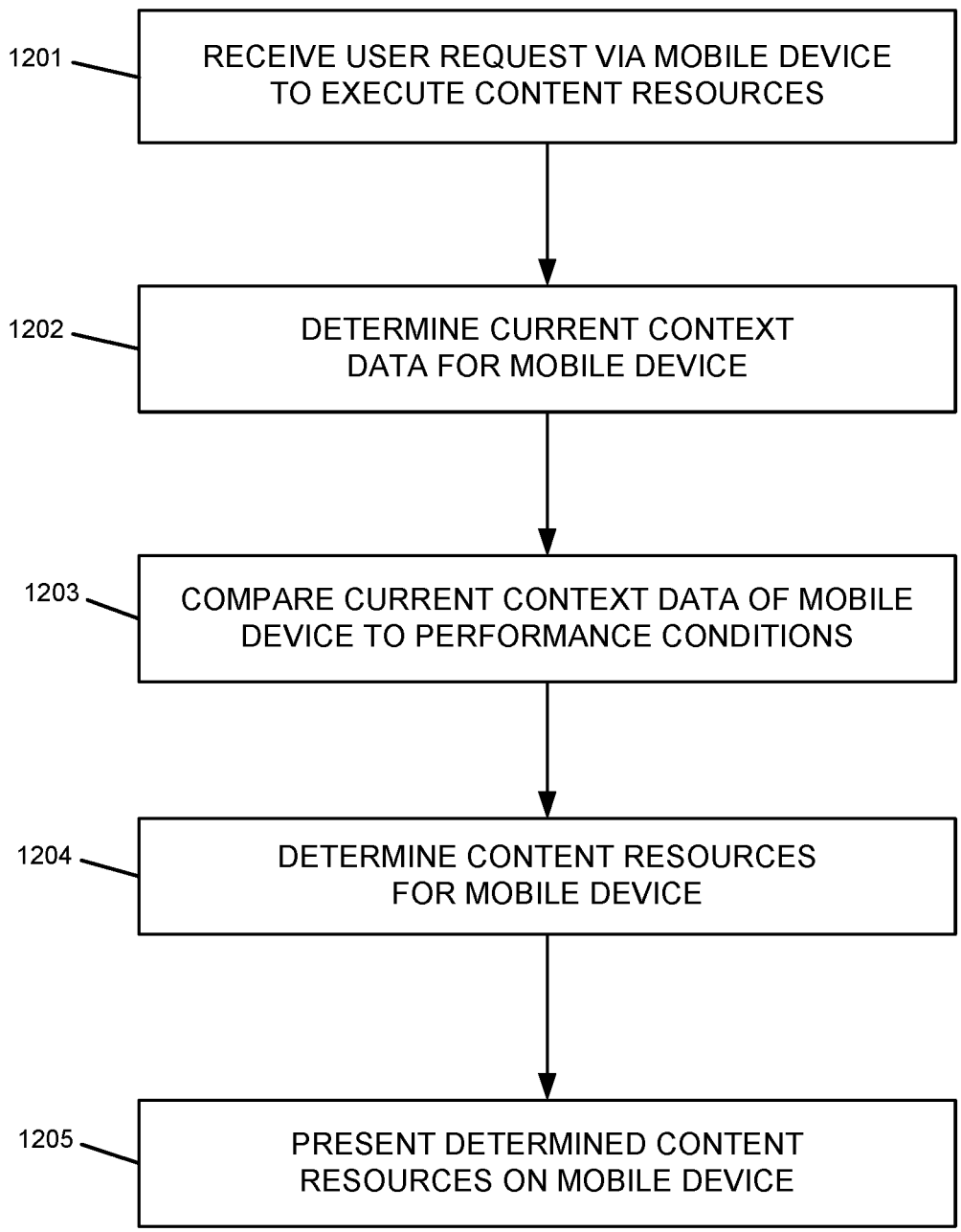
FIG. 12 is a flow diagram illustrating an example process of determining content resources to present to a user based on the current context data of a mobile device, according to one or more embodiments of the disclosure.

Referring now to FIG. 12, another flow diagram is shown illustrating an example process of determining a set of content resources based on the current context data of a mobile device. The process shown in FIG. 12 may be similar to the process described above in FIG. 11 in several respects. For example, the steps in this process may be performed by one or more components in the mobile device session analyzer systems 600 described above, such as a session analyzer server 620 and/or mobile device 610. Additionally, steps 1201-1205 may be performed after the determination of performance conditions for one or more users, based on analyses of previous content resource execution sessions by the users. However, the example process shown in FIG. 12 may be initiated by the user, for example, by instantiating and interacting with a CDN client application on a mobile device 610.

In step 1201, a request may be received by a session analyzer 620 from a mobile device indicating that a user intends to initiate a content resource execution session on the mobile device 610. For example, a user may instantiate and/or activate a CDN client application on a mobile device 610, such as a web browser, media player, gaming application, professional training or eLearning client, or any other CDN client application. In some cases, the user may expressly request a suggestion of one or more content resources for the user's current execution session on the mobile device 610.

In step 1202, in response to the user-initiated request, the session analyzer 620 may retrieve and determine the current context data of the mobile device 610. Step 1202 may be similar or identical to step 1101 discussed above. For example, the session analyzer 620 may request and receive a transmission of context data from a mobile device 610. The session analyzer 620 also may retrieve additional context data for the mobile device 610 using the other techniques discussed above, such as retrieving context data from local data stores 622, other mobile devices 610, and/or external data sources.

In step 1203, the session analyzer 620 may compare the current context data of the mobile device 610 to the previously determined performance conditions associated with the user and/or the mobile device 610. Step 1203 may be similar or identical to step 1102 discussed above. For instance, if a user has one or more performance conditions based on time, location, device movement, and background noise, then the session analyzer 620 in step 1203 may compare the session context variable values for these performance conditions to the current context data of the user's mobile device 610. The session analyzer 620 also may sum (or otherwise combine) the anticipated performance effect for multiple different performance conditions, as discussed above.

In step 1204, the session analyzer 620 may determine one or more sets of content resources to suggest to the user. Step 1204 may be similar or identical to step 1104 discussed above. For example, the session analyzer 620 may select the next content resource(s) in a sequence of content resources being executed by the user, such as television program episodes, sequential game levels, sequential eLearning modules, etc. In some cases, the session analyzer 620 be performed by analyzing the subset of performance conditions relating to multiple different CDNs and/or resource types, in order to determine the highest anticipated net positive effect on user performance among different the CDNs and/or resource types, based on the same set of current context data, as discussed above.

In step 1205, the session analyzer 620 may transmit the suggestions of the specific content resources determined step 1204 to the user's mobile device 610 for presentation to the user. Step 1205 may be similar or identical to step 1105 discussed above. In various examples, the session analyzer 620 may transmit the determined content resource suggestions via email, text message, or application-based notifications, and the suggestions may be ranked in some cases in order of the highest anticipated net positive effect on user performance.

Figure 14:
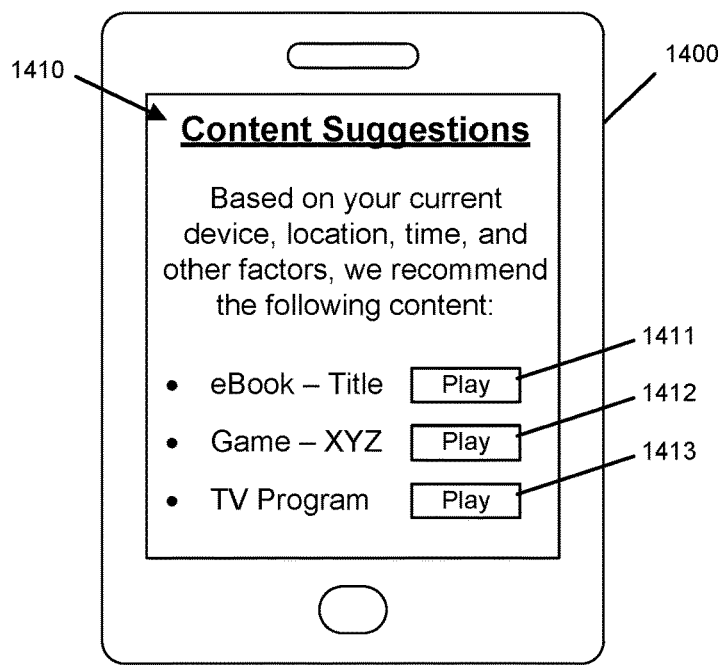
FIG. 14 is an illustrative user interface of a mobile device providing a set of content suggestions to a user based on the current context data of the mobile device, according to one or more embodiments of the disclosure.

Referring briefly to FIG. 14, another example of a user interface screen 1410 is shown on a mobile device 1400, providing multiple content suggestions in response to the user-initiated initiation that the user may wish to perform a content resource execution session. In this case, three content resource suggestions 1411-41413 have been determined based on the current context data of the mobile device 1400, including the current context state of the mobile device, the user, and the physical environment of the user and mobile device.

As discussed above, the steps of FIGS. 11 and 12 may be performed by a session analyzer server 620 or other central computing system, based on context data and user input data received from mobile device 610. However, in certain embodiments, some or all of the steps of FIGS. 11 and 12 may be performed by individual mobile devices 610 instead of, or in addition to, session analyzer 620. For example, a mobile device 610a may determine performance conditions individually and/or may receive transmissions of additional performance conditions for the user from the session analyzer 620 and/or other mobile devices 610. Using these locally stored performance conditions, the mobile device 610*a* may continuously detect and evaluate the current context data of the mobile device 610*a*, and may generate user notifications and/or content suggestions using similar techniques to those discussed above.

Figure 15:
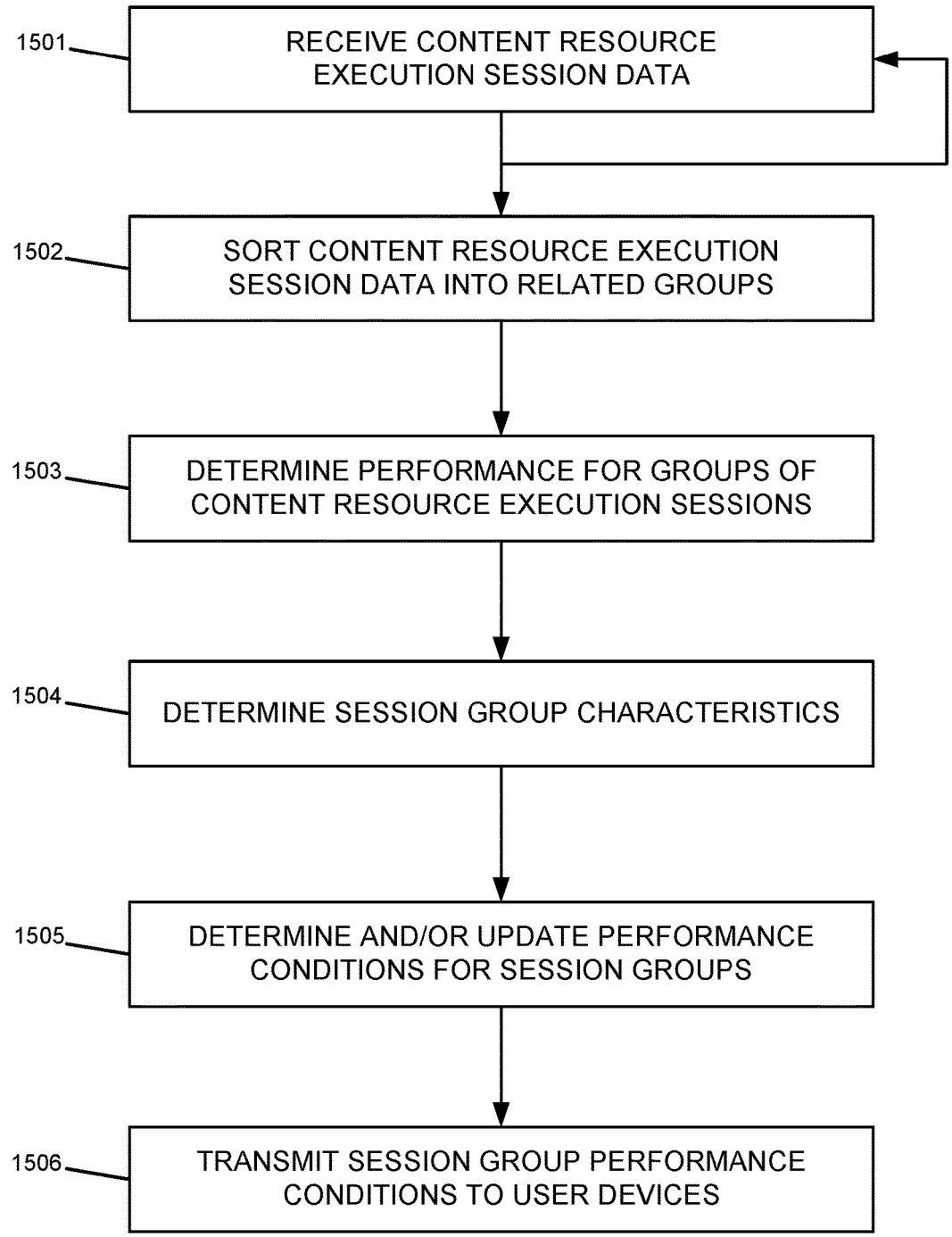
FIG. 15 is a flow diagram illustrating an example process of determining performance conditions corresponding to a user's group of content resource execution sessions, according to one or more embodiments of the disclosure.

Referring now to FIG. 15, another flow diagram is shown illustrating a process of determining one or more performance conditions associated with a user, based on a user's content resource execution sessions. The process shown in FIG. 15 may be similar to the process described above in FIG. 9 in several respects. For example, data from the user's content resource execution sessions, including session context data and session performance data, may be analyzed to determine performance conditions for the user. Similarly, the steps in this process may be performed by one or more components in the mobile device session analyzer systems 600 described above, such as a session analyzer server 620 and/or mobile device 610. However, the steps of FIG. 15, discussed below, describe groups of related execution sessions performed by a user, rather than individual execution sessions. For example, a user's overall performance for a group of content resource execution sessions may be analyzed based on session group characteristics instead of (or in addition to) the context data of individual execution sessions.

In step 1501, data relating to one or more content resource execution sessions may be received, for example, by a mobile device session analyzer 620 from one or more mobile devices 610. Step 1501 or may be similar or identical to step 901 discussed above. For example, the data received in step 1501 may include session data (e.g., user identifier, resource identifiers, execution session start time, execution session stop time, etc.), as well as various types of context data, user interaction data received by the mobile device 610, and any other data collected in connection with an execution of content resources on the mobile device 610. As shown in FIG. 15, step 1501 may execute multiple times, and thus data for multiple different execution sessions may be received, before steps 1502-1506 are performed to analyze and determine performance conditions based on the execution session data.

In step 1502, after receiving data describing multiple content resource execution sessions performed by a user on one or more mobile devices 610, the received data may be sorted and grouped into related execution sessions for analysis purposes. For example, the received execution session data may be sorted to group execution sessions performed by the user within the same CDN 100 (or 600), such as a specific media distribution CDN, a gaming CDN, a professional training or eLearning CDN, and the like. Additionally, within a specific CDN 100 or 600, the execution session data may be sorted and/or grouped by resource content type. For instance, within a gaming CDN 600, the received execution session data may be grouped into sessions by the specific game and/or game levels played. For a professional training or eLearning CDN 600, the received execution session data may be grouped into sessions by the specific training/learning modules, subjects, courses, etc.

In step 1503, one or more performance measurements may be determined for the user, for each group of content resource execution sessions determined in step 1502. Thus, step 1503 may include similar or identical techniques to those discussed above in step 902. However, rather than determining performance measurements for individual execution sessions by a user, the performance determination in step 1503 may apply to the groups of execution sessions determined in step 1502. In some cases, performance measurements for session groups may correspond to a user scores or evaluations. For example, gaming software may calculate overall user scores for games or game levels completed over multiple execution session by the user. Similarly, professional training or eLearning software may calculate overall user scores based on automated online tests or other evaluations completed at the end of an training/eLearning module, course, semester, curriculum, etc.

Additionally, performance measurements of session groups may be based on express feedback from the user regarding the group of content resources, such as user content ratings, discussion posts, content evaluations, and the like, for groups of execution sessions (e.g., training/eLearning courses, games, television programs, etc.). As discussed above, such express user feedback also may include factors such as the amount of time the user played/executed the content resources within the group, the user decisions and other interactions during the execution sessions for the group of resources, and audio and/or visual cues collected and stored by the mobile device 610 during the group of execution sessions. In some embodiments, the performance measurements determined in step 1503 also may include overall consumption velocities and/or remediation rates for the user for the group of execution sessions, rather than for individual execution sessions as discussed above in step 902.

In step 1504, one or more session group characteristics may be determined for each group of content resource execution sessions determined in step 1502. Such session group characteristics may include characteristics that apply to groups of execution sessions, rather than to individual execution sessions. For example, session analyzer server 620 and/or mobile devices 610 may determine the number of content resource execution sessions in the group, the average length of time of each content resource execution session, and the average amount of time between the content resource execution sessions in the group.

Figures 16, 17:
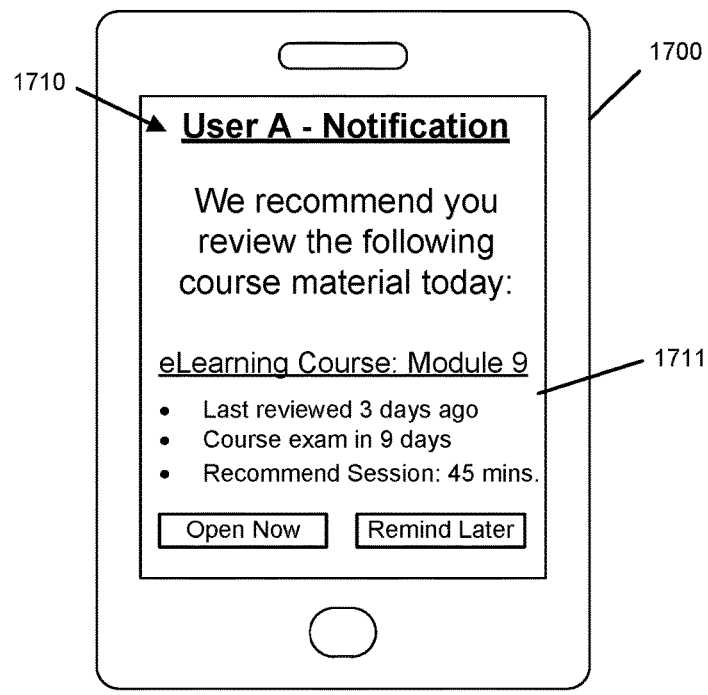
FIG. 16 is an illustrative data table containing example session group data, according to one or more embodiments of the disclosure.
FIG. 17 is an illustrative user interface of a mobile device providing a notification to a user in response to evaluating the session group performance conditions for the user, according to one or more embodiments of the disclosure.

Referring briefly to FIG. 16, an example data table 1600 is shown containing illustrative session group data. In this example, a number of different session groups have been defined in the first two columns of table 1600, each session group correspond to a specific user and specific CDN/resource type. For each session group, table 1600 includes the number of execution sessions performed by the user within the session group, the average length of each session in the group, and the average amount of time between each session in the group. It should be understood that the session group characteristics used in this example are illustrative only and non-limiting. For instance, instead of (or in addition to) average session length and average time between sessions, additional session group characteristics may include the standard deviations and variances of the session length and time between sessions, as well as other statistical measurements determined for each group of execution sessions. Additionally, for each session group in example table 1600, a performance measure is shown for session group. These performance measurements may correspond to the one or more of the group performance measurements determined in step 1503.

In step 1505, the session analyzer server 620 and/or mobile devices 610 may determine (or update) sets of user performance conditions for one or more groups of content resource execution sessions. Thus, step 1505 may include similar or identical techniques to those discussed above in step 904. However, rather than determining correlations between context data and user performance in individual execution sessions, step 1505 may include determining statistical correlations between session group characteristics (step 1504) and the user's performance data for the overall session group (step 1503). For example, a performance condition for a session group may correlate a particular pattern between the number, length, and frequency of execution sessions, and a higher or lower level of performance by the user for the session group as a whole. For instance, session analyzer 620 or mobile device 610 may determine that a user scores consistently better on training/eLearning module tests when the user studies in short frequent study sessions, as compared to longer and less frequent study sessions. As another example, the session analyzer 620 or mobile device 610 may determine that a user has a consistently lower remediation rate when the user reviews training/course materials at a frequency of 2 to 7 days, and a significantly higher remediation rate when the user reviews training/course materials at a frequency of greater than 7 days.

In some embodiments, the performance conditions for session groups determined in step 1505 may be similar to those determined for individual execution sessions, discussed above in step 904. For example, a session analyzer 620 or mobile device 610 may determine pairs of session group characteristics (or combinations of session group characteristics), along with corresponding predicted performance effect for the user (e.g., a Performance +/− on a session group performance point scale). As with performance conditions for individual execution sessions, certain session group performance conditions determined in step 1505 may apply to individual users, while other performance conditions may be applicable to groups of users. Additionally, certain session group performance conditions may be applicable to specific CDNs 600 and/or specific types of resources within CDNs 600, while others may apply to one or more users across multiple different CDNs and/or resource types.

In order to determine the session group performance conditions in step 1505, the session analyzer 620 or mobile device 610 may execute statistical analysis techniques to identify a session group characteristic (or combination of characteristics), isolate the characteristic(s), and calculate the performance effect of the characteristics. For example, the session analyzer 620 may use regression analyses to control for the performance effects of other session context variables and other session group characteristics, thereby isolating a single session group characteristic (or combination of characteristics), while effectively holding constant all other variables affecting user performance during the session group. After removing the potential performance effects caused by other session group characteristic, and individual session context variables, via regression analysis, the effect caused by one isolated group characteristic(s) may be calculated to determine the performance +/− of those characteristics. Similar regressions may be used to isolate analyze the performance effect caused by all session group characteristics. Such calculations also may take into account (e.g., control for) the difficulty of the content resources executed during the session group, based on performance data from other users executing the same resource group and/or the performance of the user executing other similar resource groups.

In step 1506, session group performance conditions determined in step 1505 may be transmitted to one or more user devices. Step 1506 may be similar or identical to step 905 discussed above. For example, reports of session group performance conditions may be generated and transmitted to client devices, as well as instructor/administrator devices associated with the users. Additionally, as discussed above in reference to FIGS. 11-14, after a set of session group performance conditions have been determined for a user, the current context of the user and the user's devices 610 may be monitored in order to provide notifications and suggestions to the user for executing certain content resources at certain times based on the session group performance data.

For example, referring briefly to FIG. 17, an example of a user interface screen 1701 is shown on a mobile device 1700. In this example, a notification and content suggestion 1711 is provided to the user based on an analysis of the user's session group performance conditions with respect to an eLearning course module. Specifically, in this example, a session analyzer 620 and/or mobile device 610 has determined a suggested pattern of study session times, frequencies, and lengths for a user, based on the user's session group performance conditions.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method comprising:
   receiving, by a session analyzer server, data from a plurality of mobile client devices, the data corresponding to a plurality of content resource execution sessions associated with a first user, the data including identifiers of particular content resources executed during the content resource execution sessions, identifiers of the particular mobile client devices on which each of the particular content resources were executed, and session context data corresponding to the content resource execution sessions and detected by sensors of the plurality of mobile client devices;
   determining, by the session analyzer server, based on the data received from the mobile client devices, a session length and amount of time between sessions for each of the plurality of content resource execution sessions associated with the first user performed on the plurality of mobile devices;
   determining, by the session analyzer server, based on the data received from the mobile client devices, performance measurements for the plurality of content resource execution sessions associated with the first user, the performance measurements indicating an evaluation result associated with the one or more previous content resource execution sessions, the evaluation result associated with a skill level or a comprehension level of the first user;
   determining, by the session analyzer server, a set of performance conditions for the first user, based on (i) the determined session lengths for each of the plurality of content resource execution sessions associated with the first user, (ii) the determined amounts of time between the plurality of content resource execution sessions, and (iii) the session context data corresponding to the content resource execution sessions detected by sensors of the mobile client devices, wherein determining the performance conditions for the first user comprises:
   determining, for each particular mobile client device of the plurality of mobile client devices:
      (a) an optimal session length for the first user, for content resource execution sessions executed on the particular mobile client device; and
      (b) an optimal session frequency for the first user, for content resource execution sessions executed on the particular mobile client device,
      wherein the optimal session lengths and optimal session frequencies determined for the first user are different for different particular mobile devices;
   monitoring, by the session analyzer server, usage of the plurality of mobile client devices by the first user, and detecting a first interaction between the first user and a first particular mobile client device that corresponds to the optimal session length and optimal session frequency for the first user determined for the first particular mobile client device; and
   in response to detecting the first interaction between the first user and a first particular mobile client device, transmitting, by the session analyzer server, a notification to the first particular mobile client device, the notification including data indicating that the first interaction between the first user and the first particular mobile client device corresponds to the optimal session length and optimal session frequency determined for the first particular mobile client device.

2. The method of claim 1, further comprising:
   receiving additional data corresponding to a plurality of additional content resource execution sessions associated with a second user, wherein the same particular content resources were executed during the plurality of additional content resource execution sessions; and
   determining a second set of performance conditions for the second user based on the additional data corresponding to the plurality of additional content resource execution sessions associated with the second user, the second set of performance conditions including:
      an optimal session length for the second user for the content resource execution sessions, wherein the optimal session length for the second user is different than the optimal session length for the first user; and
      an optimal session frequency for the second user for the content resource execution sessions, wherein the optimal session frequency for the second user is different from the optimal session frequency for the first user.

3. The method of claim 1, wherein determining the set of performance conditions for the first user further comprises:
   determining a particular session media type for each of the plurality of content resource execution sessions, and
   wherein the set of performance conditions determined for the first user comprises:
      a first optimal session length and a first optimal session frequency for the first user for the content resource execution sessions having a first media type; and
      a second optimal session length and a second optimal session frequency for the first user for the content resource execution sessions having a second media type, wherein the first optimal session length and first optimal session frequency are different from the second optimal session length and second optimal session frequency.

4. The method of claim 1, wherein determining the set of performance conditions for the first user further comprises:
determining a particular session content type for each of the plurality of content resource execution sessions, and
wherein the set of performance conditions determined for the first user comprises:
  a first optimal session length and a first optimal session frequency for the first user for the content resource execution sessions having a first content type; and
  a second optimal session length and a second optimal session frequency for the first user for the content resource execution sessions having a second content type, wherein the first optimal session length and first optimal session frequency are different from the second optimal session length and second optimal session frequency.

5. The method of claim 1, wherein determining the performance measurements for the plurality of content resource execution sessions associated with the first user comprises:
calculating a rate at which the first user returns to previously executed content during the content resource execution sessions, wherein the performance conditions determined for the first user are further based on the performance measurements for the plurality of content resource execution sessions associated with the first user.

6. The method of claim 1, wherein determining the performance measurements for the plurality of content resource execution sessions associated with the first user further comprises:
comparing a set of user inputs received via an I/O subsystem of a mobile client device during each of the plurality of content resource execution sessions, to a predetermined set of correct user inputs; and
based on the comparison, calculating one or more scores for the first user for the plurality of content resource execution sessions.

7. A mobile device session analyzer system comprising:
a processing unit comprising one or more processors; and
memory coupled with and readable by the processing unit and storing therein a set of instructions which, when executed by the processing unit, causes the mobile device session analyzer system to:
  receive data from a plurality of mobile client devices, the data corresponding to a plurality of content resource execution sessions associated with a first user, the data including identifiers of particular content resources executed during the content resource execution sessions, identifiers of the particular mobile client devices on which each of the particular content resources were executed, and session context data corresponding to the content resource execution sessions and detected by sensors of the plurality of mobile client devices;
  determine, based on the data received from the mobile client devices, a session length and amount of time between sessions for each of the plurality of content resource execution sessions associated with the first user performed on the plurality of mobile devices;
  determine, based on the data received from the mobile client devices, performance measurements for the plurality of content resource execution sessions associated with the first user, the performance measurements indicating an evaluation result associated with the one or more previous content resource execution sessions, the evaluation result associated with a skill level or a comprehension level of the first user;
  determine a set of performance conditions for the first user, based on (i) the determined session lengths for each of the plurality of content resource execution sessions associated with the first user, (ii) the determined amounts of time between the plurality of content resource execution sessions, and (iii) the session context data corresponding to the content resource execution sessions detected by sensors of the mobile client devices, wherein determining the performance conditions for the first user comprises:
    determining, for each particular mobile client device of the plurality of mobile client devices:
      (a) an optimal session length for the first user, for content resource execution sessions executed on the particular mobile client device; and
      (b) an optimal session frequency for the first user, for content resource execution sessions executed on the particular mobile client device,
    wherein the optimal session lengths and optimal session frequencies determined for the first user are different for different particular mobile devices;
  monitor usage of the plurality of mobile client devices by the first user, and detecting a first interaction between the first user and a first particular mobile client device that corresponds to the optimal session length and optimal session frequency for the first user determined for the first particular mobile client device; and
  in response to detecting the first interaction between the first user and a first particular mobile client device, transmit a notification to the first particular mobile client device, the notification including data indicating that the first interaction between the first user and the first particular mobile client device corresponds to the optimal session length and optimal session frequency determined for the first particular mobile client device.

8. The mobile device session analyzer system of claim 7, the memory storing therein a further set of instructions which, when executed by the processing unit, causes the mobile device session analyzer system to:
receive additional data corresponding to a plurality of additional content resource execution sessions associated with a second user, wherein the same particular content resources were executed during the plurality of additional content resource execution sessions; and
determine a second set of performance conditions for the second user based on the additional data corresponding to the plurality of additional content resource execution sessions associated with the second user, the second set of performance conditions including:
  an optimal session length for the second user for the content resource execution sessions, wherein the optimal session length for the second user is different than the optimal session length for the first user; and
  an optimal session frequency for the second user for the content resource execution sessions, wherein the optimal session frequency for the second user is different from the optimal session frequency for the first user.

9. The mobile device session analyzer system of claim 7, wherein determining the set of performance conditions for the first user further comprises:
   determining a particular session media type for each of the plurality of content resource execution sessions, and
   wherein the set of performance conditions determined for the first user comprises:
      a first optimal session length and a first optimal session frequency for the first user for the content resource execution sessions having a first media type; and
      a second optimal session length and a second optimal session frequency for the first user for the content resource execution sessions having a second media type, wherein the first optimal session length and first optimal session frequency are different from the second optimal session length and second optimal session frequency.

10. The mobile device session analyzer system of claim 7, wherein determining the set of performance conditions for the first user further comprises:
   determining a particular session content type for each of the plurality of content resource execution sessions, and
   wherein the set of performance conditions determined for the first user comprises:
      a first optimal session length and a first optimal session frequency for the first user for the content resource execution sessions having a first content type; and
      a second optimal session length and a second optimal session frequency for the first user for the content resource execution sessions having a second content type, wherein the first optimal session length and first optimal session frequency are different from the second optimal session length and second optimal session frequency.

11. A non-transitory machine-readable storage medium, including instructions configured to cause one or more data processors to perform actions including:
   receiving data from a plurality of mobile client devices, the data corresponding to a plurality of content resource execution sessions associated with a first user, the data including identifiers of particular content resources executed during the content resource execution sessions, identifiers of the particular mobile client devices on which each of the particular content resources were executed, and session context data corresponding to the content resource execution sessions and detected by sensors of the plurality of mobile client devices;
   determining, based on the data received from the mobile client devices, a session length and amount of time between sessions for each of the plurality of content resource execution sessions associated with the first user performed on the plurality of mobile devices;
   determining, based on the data received from the mobile client devices, performance measurements for the plurality of content resource execution sessions associated with the first user, the performance measurements indicating an evaluation result associated with the one or more previous content resource execution sessions, the evaluation result associated with a skill level or a comprehension level of the first user;
   determining a set of performance conditions for the first user, based on (i) the determined session lengths for each of the plurality of content resource execution sessions associated with the first user, (ii) the determined amounts of time between the plurality of content resource execution sessions, and (iii) the session context data corresponding to the content resource execution sessions detected by sensors of the mobile client devices, wherein determining the performance conditions for the first user comprises:
      determining, for each particular mobile client device of the plurality of mobile client devices:
         (a) an optimal session length for the first user, for content resource execution sessions executed on the particular mobile client device; and
         (b) an optimal session frequency for the first user, for content resource execution sessions executed on the particular mobile client device,
      wherein the optimal session lengths and optimal session frequencies determined for the first user are different for different particular mobile devices;
   monitoring usage of the plurality of mobile client devices by the first user, and detecting a first interaction between the first user and a first particular mobile client device that corresponds to the optimal session length and optimal session frequency for the first user determined for the first particular mobile client device; and
   in response to detecting the first interaction between the first user and a first particular mobile client device, transmitting a notification to the first particular mobile client device, the notification including data indicating that the first interaction between the first user and the first particular mobile client device corresponds to the optimal session length and optimal session frequency determined for the first particular mobile client device.

12. The non-transitory machine-readable storage medium of claim 11, including further instructions configured to cause the one or more data processors to perform actions including:
   receiving additional data corresponding to a plurality of additional content resource execution sessions associated with a second user, wherein the same particular content resources were executed during the plurality of additional content resource execution sessions; and
   determining a second set of performance conditions for the second user based on the additional data corresponding to the plurality of additional content resource execution sessions associated with the second user, the second set of performance conditions including:
      an optimal session length for the second user for the content resource execution sessions, wherein the optimal session length for the second user is different than the optimal session length for the first user; and
      an optimal session frequency for the second user for the content resource execution sessions, wherein the optimal session frequency for the second user is different from the optimal session frequency for the first user.

13. The non-transitory machine-readable storage medium of claim 11, wherein determining the set of performance conditions for the first user further comprises:
   determining a particular session media type for each of the plurality of content resource execution sessions, and
   wherein the set of performance conditions determined for the first user comprises:
      a first optimal session length and a first optimal session frequency for the first user for the content resource execution sessions having a first media type; and
      a second optimal session length and a second optimal session frequency for the first user for the content resource execution sessions having a second media type, wherein the first optimal session length and first optimal session frequency are different from the second optimal session length and second optimal session frequency.

14. The method of claim 1, wherein determining the performance measurements for the plurality of content resource execution sessions associated with the first user comprises:

analyzing user feedback data received via one or more I/O subsystems of the mobile client devices, in response to the content resources executed during the content resource execution sessions, wherein the performance conditions determined for the first user are further based on the performance measurements for the plurality of content resource execution sessions associated with the first user.

15. The mobile device session analyzer system of claim 7, wherein determining the performance measurements for the plurality of content resource execution sessions associated with the first user comprises:

analyzing user feedback data received via one or more I/O subsystems of the mobile client devices, in response to the content resources executed during the content resource execution sessions, wherein the performance conditions determined for the first user are further based on the performance measurements for the plurality of content resource execution sessions associated with the first user.

16. The non-transitory machine-readable storage medium of claim 11, wherein determining the performance measurements for the plurality of content resource execution sessions associated with the first user comprises:

analyzing user feedback data received via one or more I/O subsystems of the mobile client devices, in response to the content resources executed during the content resource execution sessions, wherein the performance conditions determined for the first user are further based on the performance measurements for the plurality of content resource execution sessions associated with the first user.

17. The method of claim 1, wherein monitoring usage of the plurality of mobile client devices by the first user comprises:

receiving periodic transmissions of data from each of the plurality of mobile client devices, each said periodic transmissions identifying a current user of the mobile client device.

18. The mobile device session analyzer system of claim 7, wherein monitoring usage of the plurality of mobile client devices by the first user comprises:

receiving periodic transmissions of data from each of the plurality of mobile client devices, each said periodic transmissions identifying a current user of the mobile client device.

19. The non-transitory machine-readable storage medium of claim 11, wherein monitoring usage of the plurality of mobile client devices by the first user comprises:

receiving periodic transmissions of data from each of the plurality of mobile client devices, each said periodic transmissions identifying a current user of the mobile client device.

* * * * *